(12) United States Patent
Land

(10) Patent No.: US 7,217,343 B2
(45) Date of Patent: May 15, 2007

(54) POINT OF USE WATER PURIFICATION METHOD AND APPARATUS

(75) Inventor: Glenn E. Land, Independence, VA (US)

(73) Assignee: Environmental Technology Enterprises, LLC., Independence, VA (US)

( * ) Notice: Subject to any disclaimer, the term of this patent is extended or adjusted under 35 U.S.C. 154(b) by 0 days.

(21) Appl. No.: 10/950,549

(22) Filed: Sep. 28, 2004

(65) Prior Publication Data

US 2005/0040024 A1   Feb. 24, 2005

Related U.S. Application Data

(62) Division of application No. 10/086,554, filed on Mar. 4, 2002, now Pat. No. 6,830,661.

(60) Provisional application No. 60/344,809, filed on Jan. 7, 2002, provisional application No. 60/326,226, filed on Oct. 2, 2001.

(51) Int. Cl.
*B01D 3/02* (2006.01)
*B01D 3/42* (2006.01)

(52) U.S. Cl. .................. 203/1; 203/4; 203/10; 203/14; 203/22; 203/DIG. 8; 203/100

(58) Field of Classification Search .................. 203/1, 203/4, 10, 14, 22, 27, 39, DIG. 8, DIG. 17, 203/100
See application file for complete search history.

(56) References Cited

U.S. PATENT DOCUMENTS

| 3,907,683 | A | * | 9/1975 | Gilmont | 202/177 |
| 4,045,293 | A | * | 8/1977 | Cooksley | 203/10 |
| 4,269,663 | A | * | 5/1981 | McFee | 202/185.3 |
| 4,585,524 | A | * | 4/1986 | Hoiss | 203/11 |
| 4,690,102 | A | | 9/1987 | Sundquist | |
| 4,724,048 | A | * | 2/1988 | Helmich | 202/176 |
| 4,957,200 | A | | 9/1990 | Turner et al. | |
| 4,985,122 | A | | 1/1991 | Spencer | |
| 5,059,287 | A | | 10/1991 | Harkey, Sr. | |
| 5,348,623 | A | | 9/1994 | Salmon | |
| 5,932,073 | A | | 8/1999 | Land | |
| 5,951,825 | A | | 9/1999 | Land | |
| 6,290,819 | B1 | | 9/2001 | Land | |
| 6,908,558 | B2 | * | 6/2005 | Stinson et al. | 210/660 |

* cited by examiner

*Primary Examiner*—Virginia Manoharan
(74) *Attorney, Agent, or Firm*—Jones, Tullar & Cooper, P.C.

(57) ABSTRACT

A compact, energy efficient, continuous-flow point of use distillation system utilizes stacked, vertically-arranged components to provide a compact and energy efficient distillation process and a device which is quick and easy to service and maintain. A housing contains a double-walled boiler vessel to which water is supplied from an external source through suitable filters. A heating source is provided to boil water in the vessel, producing steam which is supplied through a condenser to a storage container located below the boiler. A noninvasive liquid level sensor maintains the water level in the boiler and the controller is provided to activate the boiler when water is required for the storage reservoir.

6 Claims, 22 Drawing Sheets

POINT OF USE WATER PURIFICATION METHOD AND APPARATUS

This application is a divisional of a application: application number 10/086,554 filed on Mar. 4, 2002 now U.S. Pat. No. 6,830,661

This application claims the benefit of U.S. Provisional Application No. 60/326,226, filed Oct. 2, 2001, and of U.S. Provisional Application No. 60/344,809 filed Jan. 7, 2002, the disclosures of which are hereby incorporated herein by reference.

BACKGROUND OF THE INVENTION

The present invention relates, in general, to point-of-use distillation systems, and more particularly to compact, continuous-flow distillers for the purification of drinking water.

The global need for safe drinking water is commonly recognized, for the health problems resulting from chemicals, bacteria and viruses in drinking water has been well documented. Many products, including water distillation devices, have been developed in attempts to provide safe water for drinking, but problems still exist. For example, reverse osmosis (RO) point of use water purification systems have limited and unsustainable contaminant removal, can allow the formation of biofilm on filter membranes, and produce waste water. Research has shown that biofilming can be reduced by timely and critical maintenance, but it cannot be completely eliminated and backflushing may contaminate the system. Ultraviolet (UV) water purification systems only address the problem of microbial contamination, and do not remove other contaminants from water. Furthermore, changing turbidity conditions in the water reduces the ability of such systems to kill microbes. Distillation is the oldest and most reliable technology for point of use water purification, for it is reliable, sustainable, and removes a greater percentage of contaminants from water than any other technology. However, difficulties have been encountered in the development of acceptable point of use distillers, and these problems have prevented their widespread use.

A common problem in prior art distillers is the difficulty involved in properly cleaning the boiler, for it usually is difficult to get to the boiler and difficult to clean scale from its interior. The buildup of scale in the boiler tanks of distillers is partially due to the fact that untreated influent water contains bicarbonate ions which will initially break down into carbonate ions, causing the formation of scale. This problem can be reduced by preconditioning or softening the influent water and by preheating influent water prior to entering the boiler. Partial, instead of complete, draining of the boiler can also reduce scale buildup, but periodic cleaning is still required and the construction of most prior distillers have made the cleaning process so complicated that the distiller gradually becomes less efficient.

Although numerous attempts have been made to facilitate the descaling and cleaning of distillers, the problem has not been completely solved, for most such attempts have resulted in additional plumbing requirements or additional components, which increase the cost of purchasing and maintaining the units. For example, some distillers have water cooled condensers which produce waste water and some have periodic automatic draining of the boiler, but these still do not reduce scale buildup or eliminate the difficulties of cleaning.

Proper cleaning of a typical vapor generating distiller apparatus requires substantial time, labor and prolonged periods of operational downtime. In some cases, cleaning may include introduction of cleaning agents into the apparatus and leaving these agents in place for a period of time. Not only does this require long periods of downtime, but it may also be an unwanted source of pollution and contamination of the distilling apparatus.

Increasingly, another concern about the use of distilling devices is their poor energy efficiency. In order to provide an energy efficient point-of-use distiller which can also produce a continuous flow of distilled water, it is necessary to maintain a steady liquid level in the distiller boiler. However, level sensors and controls generally have been located in the boiler, making it difficult to maintain the needed steady liquid level and, in addition, making it even more difficult to clean the boiler. Further, the introduction of cold water into a boiler interrupts vapor production and reduces energy efficiency.

Yet another concern of distilling devices is the evacuation of volatile organic compounds and chemicals (VOC's) that are released during the distillation process. These VOC's, if released in the boiler, can contaminate the distillate. Other problems in the prior art include the fact that some water purification systems produce too much heat, and electric cooling fans tend to be too noisy.

Of great concern today are anticipated government regulations concerning the sanitation of point of use (POU) devices. Sanitation regulation will bring added expense and potential liability to the POU industry. Adding UV upstream and downstream of a reverse osmosis device will not completely eliminate biofilming of RO membranes nor will it match the contaminant removal of distillation. Distillation devices are the least likely to become contaminated; however, sanitation issues still must be properly addressed by facilitating the sanitizing of a distilled water storage reservoir should it become necessary.

Thus, there is a need for a continuous flow water distillation system which is fast and easy to clean and maintain, is energy efficient, incorporates thermal energy recovery, substantially reduces ambient heat, is less noisy, is easy to sanitize, is simple to construct and which is capable of efficient, reliable, and sustainable operation over a long period of time.

SUMMARY OF THE INVENTION

It is, therefore, an object of the invention to provide a simple, energy efficient and easy-to-maintain, continuous flow, point of use distiller for providing clean, pure drinking water.

Another object of the invention is to provide a point of use, continuous flow water distiller utilizing a boiler having a removable vessel consisting of inner and outer containers for vapor generation, which reduces the time, labor and operational downtime normally associated with proper cleaning of such apparatus.

Another object of the invention is to provide a drinking water distiller wherein the initial cost associated with the device is amortized by savings in reduced time, labor and operational downtime.

Another object of the invention is to provide a drinking water distiller which utilizes a simplified system for detecting, controlling and maintaining liquid level in a removable vapor generating vessel which is provided in the distillation system.

A further object of the invention is to provide a liquid level measuring device for a distiller which is noninvasive and which is capable of being utilized in a wide variety of other applications and in combination with a variety of containers without requiring substantial modification of the containers.

Another object of the invention is to provide a preheating chamber for a point-of-use distiller which substantially increases energy efficiency by eliminating influent interruption of vapor production and which releases and evacuates VOC's from influent water prior to entering the boiler.

Another object of the invention is to provide a heat exchanger for thermal energy recovery to further increase energy efficiency and to substantially reduce heat released to the ambient.

Another object of the invention is to reduce cooling fan noise by incorporating aerodynamics.

Yet another object of the invention is to provide a device which is easy and inexpensive to sanitize should that become necessary.

Briefly, the present invention is directed to a continuous flow drinking water distiller which utilizes stacked, vertically-arranged components to provide a compact and energy efficient distillation device which may be quickly and easily serviced, maintained and sanitized. The device includes a housing which contains a double-walled vessel which serves as the boiler for the distiller and to which water is supplied from an external source through suitable filters. A heating source is provided to boil water in the double-walled vessel, producing steam which is supplied to a condenser, with the condensate being directed to a storage container located below the boiler. A noninvasive liquid level sensor maintains the water level in the boiler and a controller is provided to activate the boiler when water is required for the storage reservoir. Located between the reservoir and the boiler in the vertical stack of the distiller device is a chiller tank which receives and cools water from the reservoir, as needed.

The device of the present invention is a completely closed system producing pure condensed steam distilled water so that sanitizing is less of a concern than is the case with other technologies. However, if sanitizing of the storage reservoir should become necessary, the device is constructed so that a side panel of the cabinet can be removed and the reservoir easily slid out to be sanitized or replaced with a sanitized reservoir. Alternatively, a steam cleaning tube (not shown) may be provided to connect the vapor port of the boiler to the reservoir whereby the reservoir can be steam cleaned on location. Another alternative is simply to shut the condenser fan off so that steam, instead of distillate, is directed into the reservoir from the boiler.

More particularly, in a preferred form of the invention the boiler vessel includes an inner container nested within a somewhat larger outer container. The inner and outer containers forming the vessel may be stainless steel, for example, with each container having a bottom wall and a generally cylindrical side wall formed with outwardly extending flanges at the top peripheral edge. The outer vessel may have attached legs for supporting and/or mounting the apparatus within the distiller device, for example, although other mounting devices may be provided, while the inner container is supported within, and spaced from, the outer container by its top flange and a suitable gasket which seals the flanges. Water, or other liquid to be heated, is delivered to the double-walled boiler by way of an inlet port through the side wall of the outer container, preferably below the desired liquid level, with an inlet tube being attached to this port. If desired, a drain port for attaching a drain line may be located on the bottom of the outer container for draining liquid from the boiler. Such a drain port may be connected to a "T" fitting through which liquid to be heated can be delivered to the boiler.

A single vessel boiler may be utilized as an alternative to the preferred inner and outer vessel boiler, in which case the vessel is removably seated within an open top insulative boiler housing or pocket. A drain pipe is attached to a drain port in the bottom wall of the vessel and protrudes vertically downwardly through an orifice in the bottom wall of the housing or pocket. A drain tube is removably connectable to the drain pipe by a suitable quick connect. Water to be treated preferably is introduced into the single vessel boiler by way of a supply line which is connected to a nipple or a "T" connector attached to the drain line.

In the preferred form of the invention, the side and bottom walls of the inner container and the somewhat larger outer container are spaced apart to provide a preheating chamber for receiving liquid introduced through the inlet port. Small ports may be provided in the upper part of the side wall of the outer vessel, above the water level in the preheating chamber, for venting volatile organic compounds and chemicals released by the preheating process. An orifice in the bottom of the inner container permits liquid to flow from the inlet port through the preheating chamber and into the inner vessel. A heat source is provided for the double-walled vessel and preferably is a heater attached to a boiler lid and extending downwardly into the liquid within the inner container. When the heater is on, heat from the heated liquid in the inner container radiates outwardly into the space between the containers to preheat the liquid in the preheating chamber.

The boiler lid also carries a vapor outlet tube for delivering vapor from within the boiler to a condenser for subsequent delivery of distillate to the storage reservoir.

A heat exchanger may be provided inline between the boiler and the condenser for effecting thermal energy recovery whereby energy efficiency is increased and radiant heat to the ambient is substantially decreased. The heat exchanger is connected to preheat influent liquid before it is supplied to the preheating chamber.

To detect, control, and maintain a desired liquid level in the boiler vessel of the distiller of the present invention, a noninvasive sensor and controller is provided. Although the sensor and controller is described as a part of the distiller of the present invention, it also may be utilized for noninvasively controlling liquid level in any container. In addition, it can be used with varying operating pressures as well as with different liquid temperatures, viscosities, turbidity and specific gravity. Such a sensor is valuable in a distiller since the maintenance of a steady liquid level in the boiler substantially reduces the formation of scale caused by fluctuating liquid levels. A simplified version of the apparatus is useful for simply detecting an empty or low liquid level in an associated container or a bottom-draining container.

The noninvasive sensor and controller of the present invention, hereinafter referred to simply as a sensor, detects, measures and controls liquid level within a container from a location outside the container. In one embodiment, the sensor includes an enclosed container having, for example, a cylindrical side wall with top and bottom closures, or caps. A first tube extends through the bottom cap of the housing and is connected to the drain tube of a container in which the liquid level is to be measured. The top of the sensor housing is vented to atmosphere through a tube in the top sensor cap, and a reed float switch assembly mounted on the top cap protrudes downwardly into the sensor housing. The sensor is located so that the reed switch operates at the desired levels in the container which are to be detected; thus, the sensor may be located to detect the lowermost level in the container or the highest desired level in the container, or two switches may be provided in the sensor housing to measure both.

Another embodiment of the noninvasive sensor includes multiple reed switches for detecting various levels of liquid in the container and for controlling a solenoid valve which regulates the flow of inlet water to the container. The inlet water may flow from the solenoid valve, through the sensor housing, and then to the container to be controlled, or may flow from the solenoid valve to a 'T' connector and from the connector to both the sensor and the container. The 'T' connection is desirable, for example, when a heat exchanger is being utilized in line between the boiler and condenser.

In a further embodiment, the upper portion of the sensor housing may be connected to the upper portion of the container in which the liquid level is to be controlled in order to provide pressure equalization between the sensor and the container. Such a connection is desirable when the container being controlled is operating at pressures other than atmospheric. It will also be understood that the outlet from the solenoid-controlled inlet valve may be connected directly to the liquid container or to a drain line for the container, rather than being connected through the sensor housing. Furthermore, suitable alarms may be provided in connection with the sensor.

The distiller of the present invention may be a stand-alone floor unit, or may be configured as a portable counter-top batch or continuous flow distillation apparatus having a completely open top for quick and easy removal and cleaning of the boiler and a heat source that never has to be cleaned. The distiller may also be configured to have the features described above but adapted for under-counter and under-sink installations in typical kitchens to provide a convenient source of pure water for delivery to sink faucets, refrigerator ice makers or cold water supplies, or for various other applications.

BRIEF DESCRIPTION OF DRAWINGS

The foregoing, and additional objects, features and advantages of the present invention will become apparent to those of skill in the art from the following detailed description of preferred embodiments thereof, taken in conjunction with the accompanying drawings, in which.

DESCRIPTION OF PREFERRED EMBODIMENTS

Figure 1:
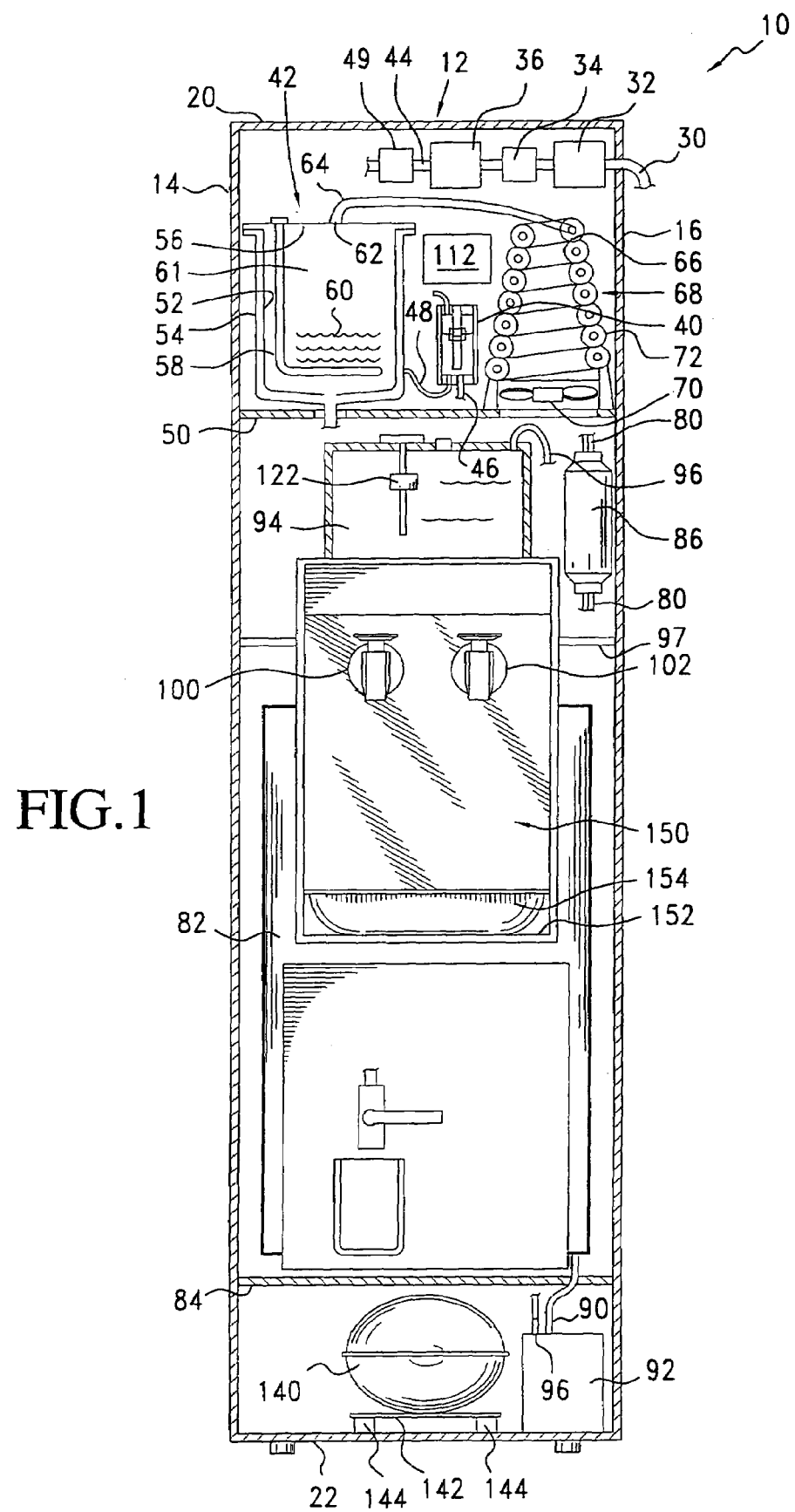
FIG. 1 is a diagrammatic front elevation, partially cut away, of a point-of-use distiller in accordance with the present invention.
Figure 2:
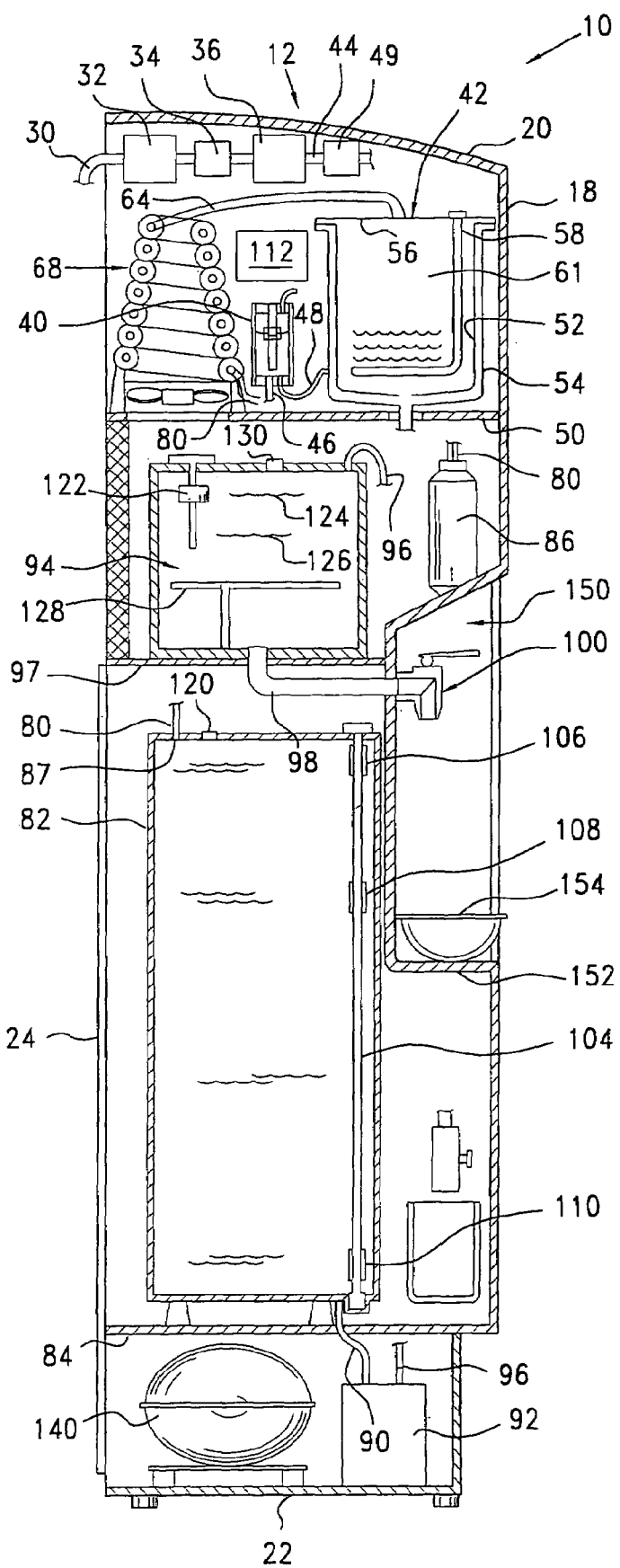
FIG. 2 is a diagrammatic side elevation, partially cut away of the device of FIG. 1.
Figure 3:
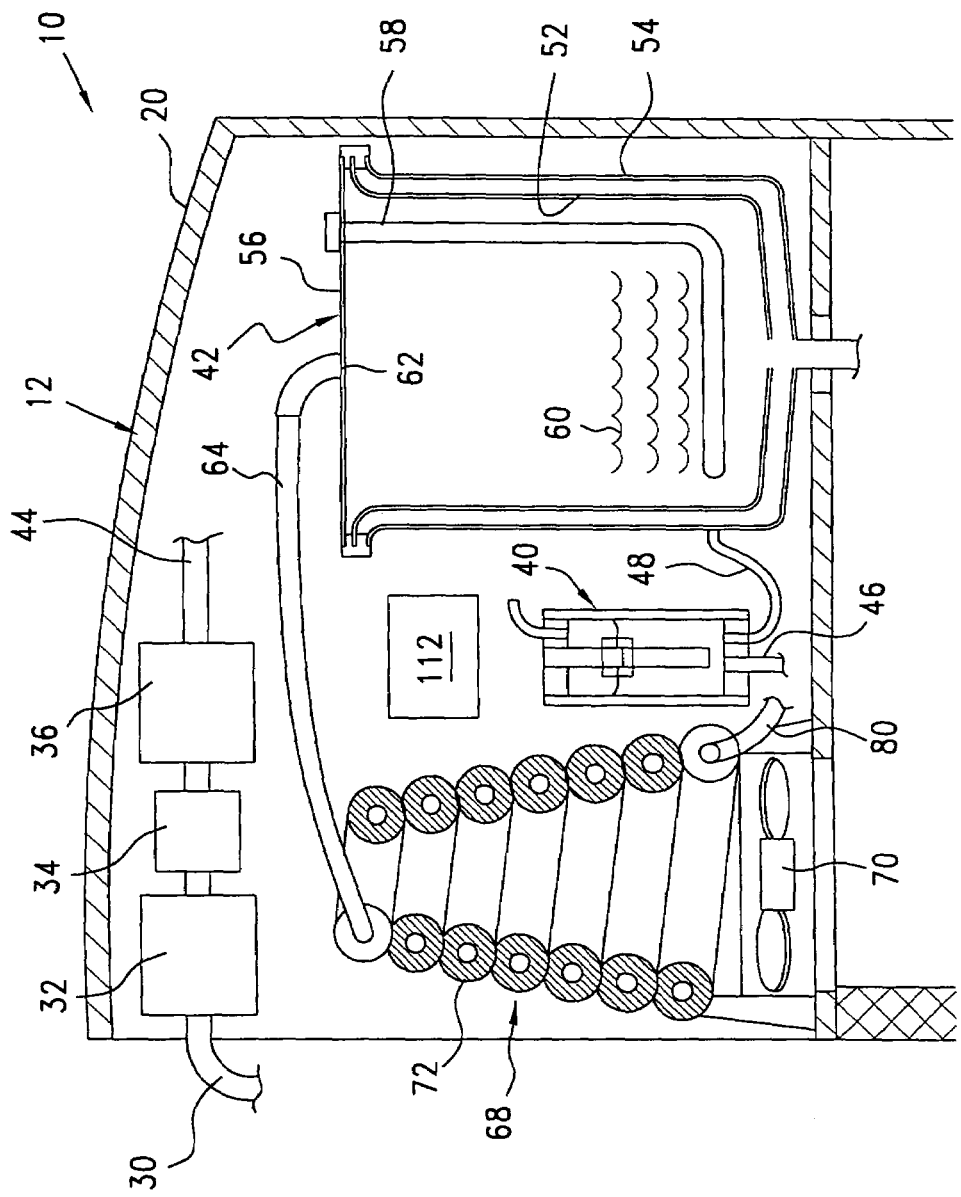
FIG. 3 is an enlarged view of a top portion of the device of FIG. 2.
Figure 4:
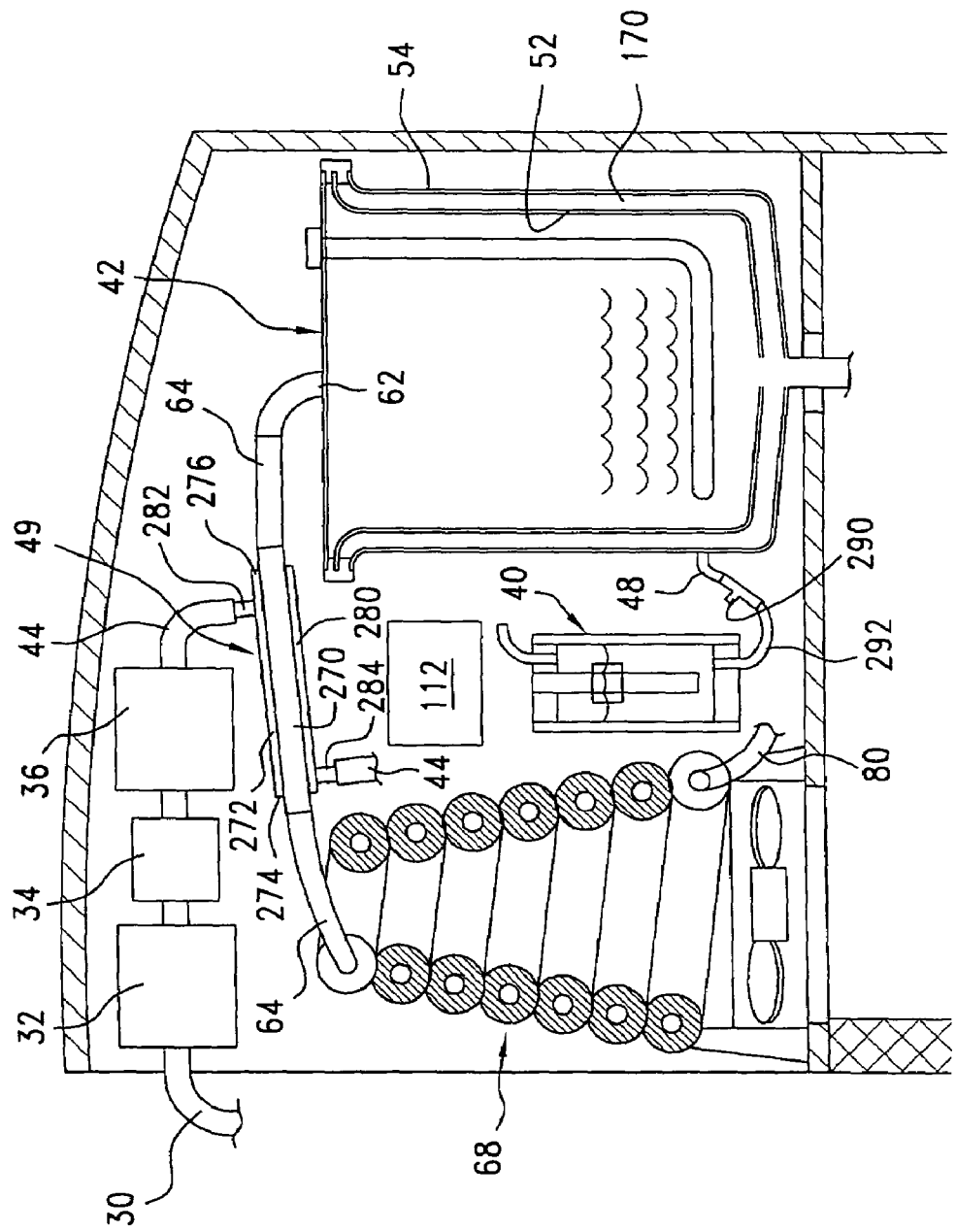
FIG. 4 is similar to FIG. 3 with the addition of a heat exchanger and illustrating a 'T' connector.

Turning now to a more detailed description of preferred embodiments of the present invention, there is illustrated in FIGS. 1, 2, 3 and 4 a vertically stacked point-of-use water distiller, generally indicated at 10, mounted within a suitable housing 12 having side walls 14 and 16, a front wall 18 (FIG. 2), and top and bottom walls 20 and 22, respectively. Influent liquid, preferably water, to be distilled is supplied to the distiller 10 by way of a feed line 30 from a suitable source (not shown). Preferably, the water is supplied through an in-line prefilter 32 for conditioning it to inhibit the formation of scale, and through a strainer 34 for removing particulates from the water. The water is then supplied through an in-line solenoid valve 36 which controls the flow of water into the distiller, and a remote, non-invasive liquid level sensor and controller 40, to be described in greater detail hereinbelow, regulates the operation of the solenoid to supply water to a boiler vessel 42, also to be described in greater detail hereinbelow. When sensor 40 senses a low level of water in vessel 42, it activates solenoid 36 to supply water by way of solenoid outlet 44. This outlet 44 may supply water to vessel 42 through the sensor 40, as by way of controller inlet 46, or may supply water directly to vessel 42, as will be described. When water is supplied to the vessel by way of sensor 40, it is directed to the vessel 42 from the controller by way of sensor outlet line 48. The solenoid outlet 44 may supply water to vessel 42 through a heat exchanger 49, as will be described.

The boiler vessel 42 may be mounted, for example, on an upper mounting platform 50 secured in the housing 12. The vessel includes inner and outer spaced containers 52 and 54 to form a double walled boiler vessel, and the upper ends of the containers are closed by a removable lid, or cover 56. A heating element 58 may be mounted on the cover 56 so as to extend into the inner container and below the level of water 60 when the lid is closed. When the water is heated by element 58, the resulting vapor collects in the upper part 61 of vessel 42 and is conveyed through a port 62 in the cover 56 and through a vapor tube 64 to an inlet 66 of a condenser 68 which, preferably, is supported on mounting platform 50. The vapor may pass through the optional heat exchanger 49 which may be connected inline with vapor tube 64. A fan 70 is provided to cool coils 72 of the condenser 68 and the resulting distilled water is supplied by way of line 80 (FIG. 2) to a reservoir 82 which may be supported on a lower mounting platform 84 secured in the housing 12. The distilled water supplied to reservoir 82 may be fed through an intermediate filter 86 inserted in line 80 which may, for example, be a carbon filter provided for polishing and enhancing the taste of the purified water. The filter 86 supplies the distilled filtered water by way of line 80 to inlet 87 of reservoir 82.

A reservoir outlet line 90 is located at the bottom of reservoir 82 and leads to the inlet of a pump 92 which may be activated to transfer water from the reservoir to a chiller tank 94 by way of pump outlet line 96. The chiller tank may be supported by a central mounting platform 97 secured in housing 12. Cooled, purified water is dispensed from the chiller tank 94 by way of outlet 98 and spigot 100. If desired, a second spigot 102 may be provided to dispense purified water that is not chilled, from the upper portion of the chiller tank 94.

A triple float switch, generally indicated at 104, is provided in the reservoir 82 and incorporates a top level sensor switch 106 to detect when the reservoir is full, a middle level sensor switch 108 to detect an intermediate liquid level, and a lower level or bottom level switch 110 to detect when the reservoir is empty. These switches are all connected to a control circuit 112 located in housing 12 so that when switch 106 is activated, the control circuit stops the generation of water vapor, the intermediate switch 108 provides a signal to begin generating vapor when the water level in the reservoir is at the selected intermediate level, and the lower switch 110 prevents the pump 92, from operating when there is no water in the reservoir. An air vent/filter 120 is provided in the top of reservoir 82 to permit the purification process to operate at or near atmospheric pressure.

The chiller tank 94 includes a float switch 122 connected to control circuit 112 to activate and deactivate the pump 92 as the water level in the tank varies between a high level, indicated at 124, and a low level, indicated at 126. A baffle 128 may be provided in the chiller tank to separate ambient temperature water in the upper portion from cooled water in the lower portion of the tank, to permit chilled or ambient temperature water from the lower or upper portion, respectively, to be supplied to the spigots 100 and 102, as described above. A chiller vent/filter 130 in the top wall of chiller 94 permits water to flow to the spigots 100 and 102 by gravity. A compressor 140, which may be supported on the bottom wall 22 of the housing 12, as by means of a platform 142 supported by legs 144, is operably connected to the chiller tank 94 for chilling the water in that tank. A conventional refrigerant condenser coil is operably connected to the compressor 140.

It will be understood that the walled housing 12 may be supported by a suitable internal frame which is conventional and thus is not shown, with the walls being in the form of detachable panels for providing access to the various components described above. In a preferred form of the invention, the front panel 18 incorporates a recess 150 which protects the spigots 100 and 102 and which provides a seat 152 for receiving a sanitary drip tray 154 such as that described in copending U.S. application Ser. No. 09/597, 807, filed Jun. 19, 2000 the disclosure of which is hereby incorporated herein by reference. In addition, the spigots 100 and 102 may incorporate sanitary shields such as those described and illustrated in copending U.S. application Ser. No. 09/552,660, filed Apr. 19, 2000 the disclosure of which is hereby incorporated herein by reference.

Figure 5:
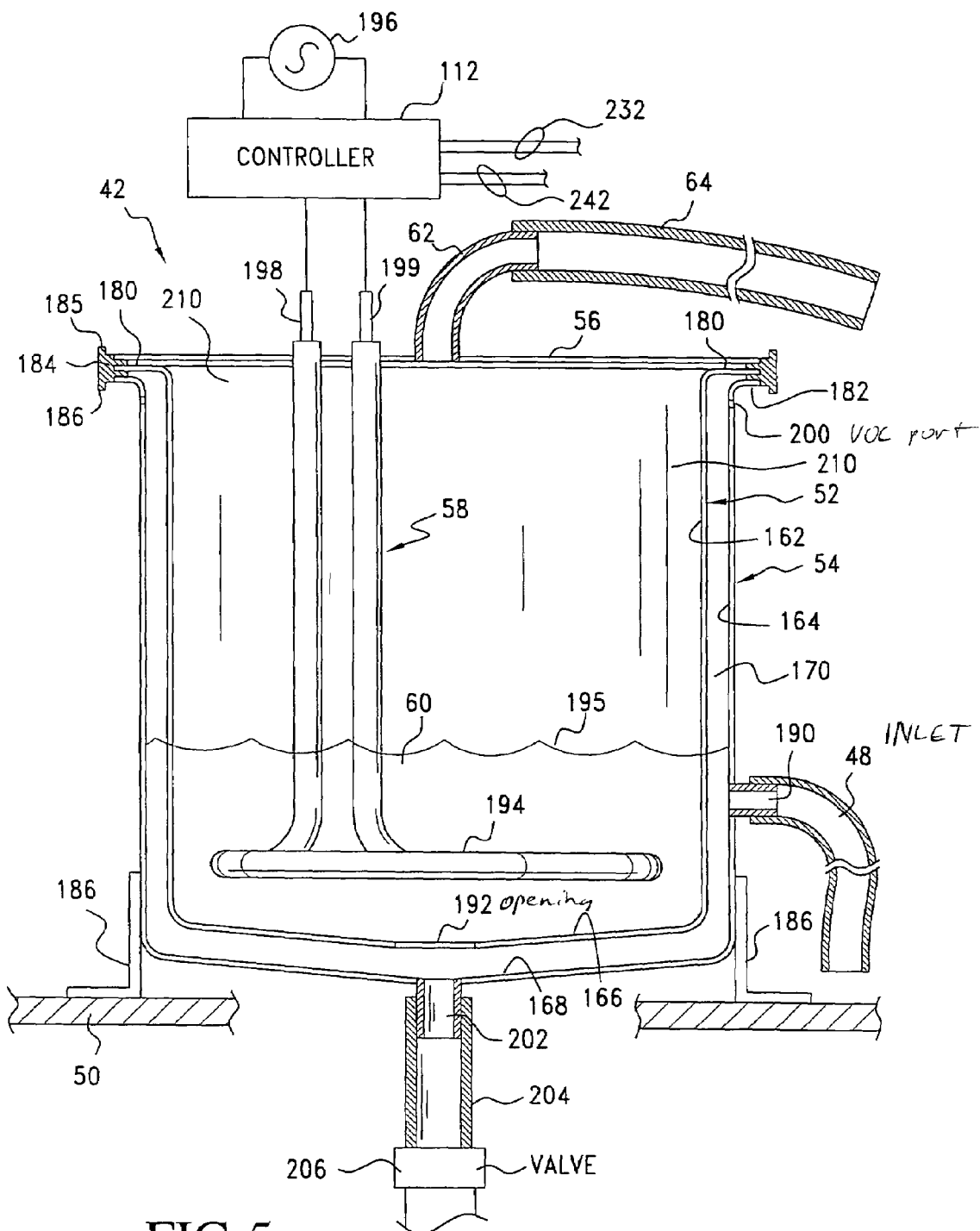
FIG. 5 is a diagrammatic cross sectional view of the double container boiler vessel utilized in the system of FIG. 1.

Vessel 42 is illustrated in greater detail and in an enlarged view in FIG. 5, to which reference is now made. As there illustrated, vessel 42 includes inner and outer containers 52 and 54 preferably having generally cylindrical side walls 162 and 164, respectively, and downwardly tapered bottom walls 166 and 168, respectively. The inner container 52 is slightly smaller in height and diameter than the outer container 54 so that when they are nested the side walls and bottom walls are spaced apart to provide a preheating chamber 170 therebetween. The top ends of the two vessels are open, and include outwardly extending flanges, the inner vessel including a flange 180 which, when the containers are nested, extends over, and rests on, a corresponding outwardly extending flange 182 on the outer container. Both flanges are formed around the top peripheral edges of their respective containers. Preferably, a single annular spacing and sealing gasket 184 fits over the flange 180, with the gasket bottom surface engaging flange 182 and its top surface receiving the cover 56 for the vessel. The gasket 184 preferably extends slightly outwardly from the flange 180 and has an upward extending annular shoulder portion 185 for positioning the cover 56 and an annular downwardly extending shoulder portion 186 for positioning the gasket onto flange 182. Two separate gaskets may be used, if desired. Suitable clamps (not shown) may be provided to releasibly secure the cover 56 and to hold the containers in their nested position with the inner container centered within the outer container, with the thickness of the gasket 184 and the relative heights of the container side walls regulating the spacing between the bottom walls 166 and 168.

The outer container may be supported on the mounting platform 50 by suitable mounting brackets, such as those illustrated at 186, and includes an inlet port 190 for connection to the water line 48, described above with respect to FIGS. 1–4. Water from line 48 flows through port 190 into the preheating chamber 170, downwardly between the spaced sidewalls 162 and 164 and the spaced bottom walls 166 and 168, and upwardly through an orifice 192 in the bottom wall 166 into the inner container 52, as indicated at 60. As illustrated, the heater element 58, which preferably is mounted on the cover 56, extends downwardly into the inner container to position heating coil 194 below the surface 195 of water 60. The heating element 58 is connected to a suitable voltage source 196 through a control circuit 112 by way of electrode contacts 198 and 199 extending through the cover 56. When the intermediate float switch 108 (FIG. 2) signals the need for distilled water for the reservoir 82, the heating element is activated by the controller 112 to boil the water in the inner container, producing vapor which escapes through outlet 62 and is delivered to the condenser 68 through tubing 64 and, if desired, through an in line heat exchanger 49 (FIG. 4), as previously described. The heated water in the inner container 52 also serves to preheat the water in the preheat chamber 170 and, if desired, a plurality of vents 200 may be provided around the upper periphery of the outer container 54 to release volatile organic compounds and chemicals which may be released by the heating of this preheated water.

A drain outlet port 202 preferably is provided in the bottom wall 168 of outer container 54 for draining the liquid boiler vessel 42. The outlet port 202 is connected by way of line 204 through a drain valve 206. If desired, water from line 48 may flow into the preheating chamber through a "T" connector in drain line 204 instead of through port 190.

The removable cover 56 engages the top of gasket 184 to enclose the boiler vessel and to produce a vapor chamber 210 within the inner container 52 above the water level 60. Although the heater element 58 is illustrated as being connected to the removable cover, it will be understood that alternative locations are possible; for example, if desired, the heater may be attached to the bottom wall of the outer container 54 so that it protrudes upwardly through opening 192 in the bottom wall of the inner container 52.

In operation, liquid to be vaporized, preferably water, is introduced, for example, through inlet line 48 and into preheating chamber 170. The liquid then flows into the interior of container 52 where it is heated by the heating element 58, when water vapor is required. When the water is being heated within the inner container, the water in the preheat chamber 170 is also heated to release undesired VOC's from the water supply before it is delivered to the inner container. This prevents such VOC's from entering the outlet 62, thereby improving the purity of the distilled water provided by the device of the present invention. The preheated influent water entering the interior of container 52 substantially increases energy efficiency by eliminating cold water interruption of vapor production.

The buildup of scale in a boiler of the type described herein is partially due to the fact that fresh untreated influent water includes impurities such as bicarbonate ions which initially break down into carbonate ions in a boiler. A combination of preconditioning or softening of the influent water in the prefilter 32 combined with preheating influent water in the preheating chamber 170 and maintaining a constant liquid level in boiler 42, together with periodic partial draining of the boiler vessel, nearly eliminates the buildup of scale. However, after a long period of operation precipitates will accumulate on the surfaces of the inner vessel, and periodic cleaning is required. The provision of inner and outer containers in the boiler vessel of the present invention greatly reduces the labor and operational downtime associated with proper cleaning, because the inner container can be quickly and easily removed for cleaning. Thus, the cover 56 is released and removed, permitting the heating element 58 to be lifted out of the inner container. The inner container 52 may then simply be lifted out of the outer container, cleaned in any convenient manner, or simply replaced by a new or refurbished container, and the cover replaced and secured. By keeping a spare inner container available, downtime of the device is greatly reduced.

Figure 6:
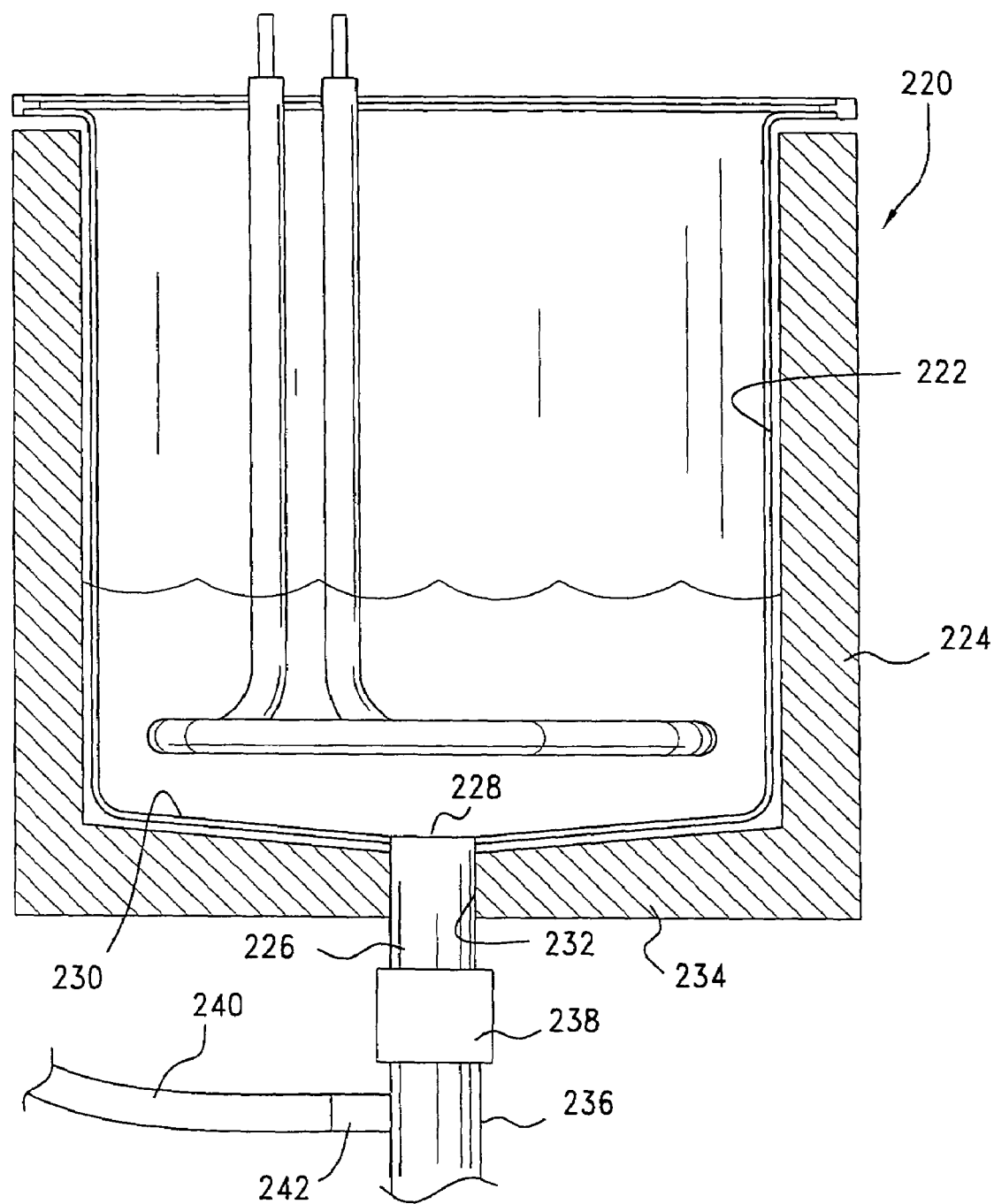
FIG. 6 is a diagrammatic cross sectional view of an alternative single container boiler which may be utilized in the system of FIG. 1.

An alternative to the double container vessel described above is a single container boiler 220, as illustrated in FIG. 6. The boiler includes a single container 222, which is removably seated within an open top insulative boiler housing or pocket 224 secured on a mounting platform within housing 12. A drain pipe 226 is attached to a drain port 228 in the bottom wall 230 of the container 222. The drain pipe 226 protrudes vertically downward through an orifice 232 in the bottom wall 234 of the housing or pocket 224. A drain tube 236 is removably connected to the drain pipe 226 by way, for example, of a suitable quick connect 238 or by use of silicone rubber tubing that will slide onto the drain pipe. Water to be treated is introduced into the single container 222 by way of a supply line 240 which is connected to a nipple or a "T" 242 attached to the drain line 236.

The single container 222 can be removed from the housing or pocket 212 for cleaning or replacing. However, unlike the inner container of the double container vessel 42 discussed above, it must first be drained and then disconnected from the drain tube 236. Also, the pre-heating chamber and the VOC ports are eliminated; thus, the double container boiler is preferred.

Figure 7:
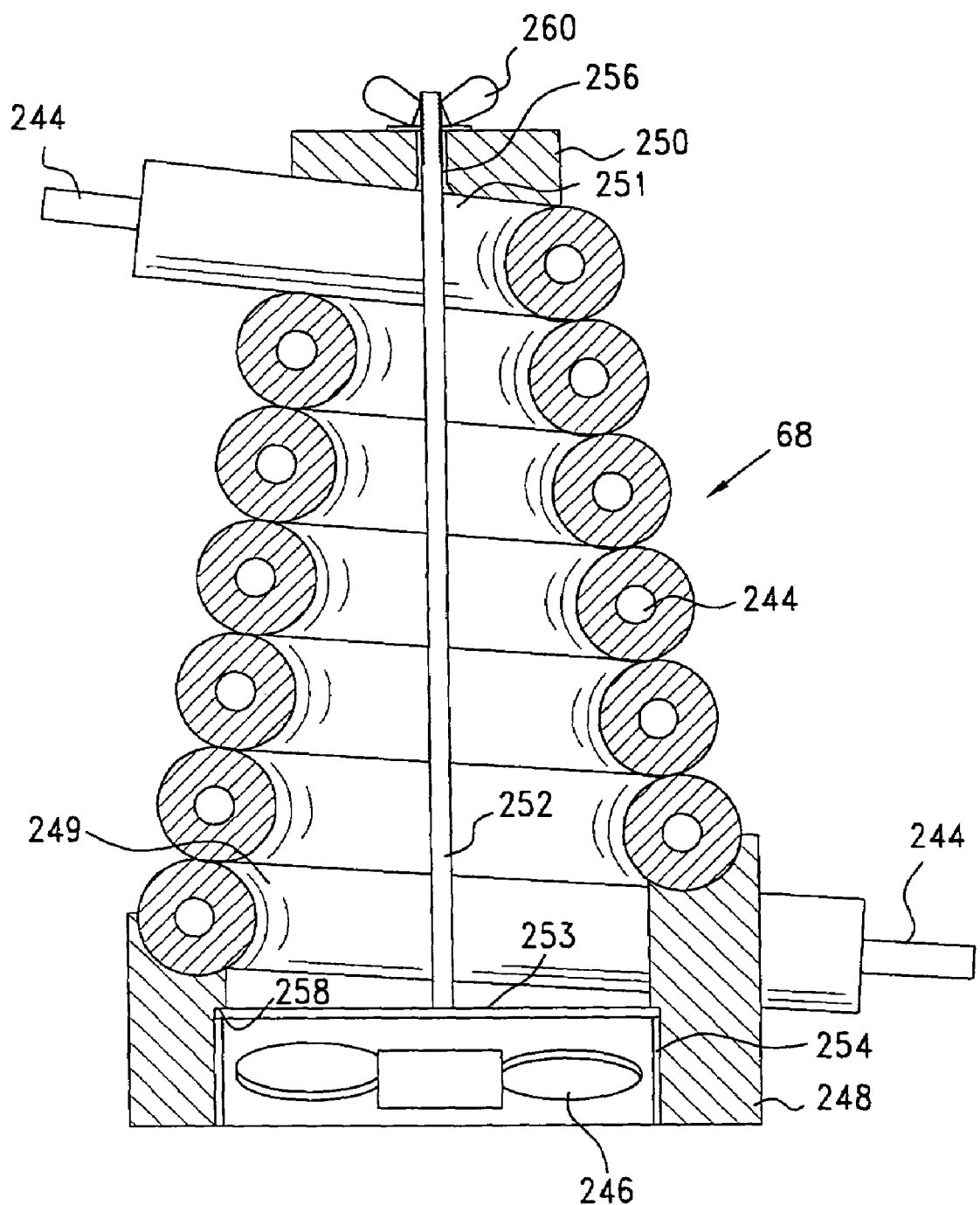
FIGS. 7 and 8 illustrate assembled and exploded views, respectively, of a conical condenser coil for the device of the invention.
Figure 8:
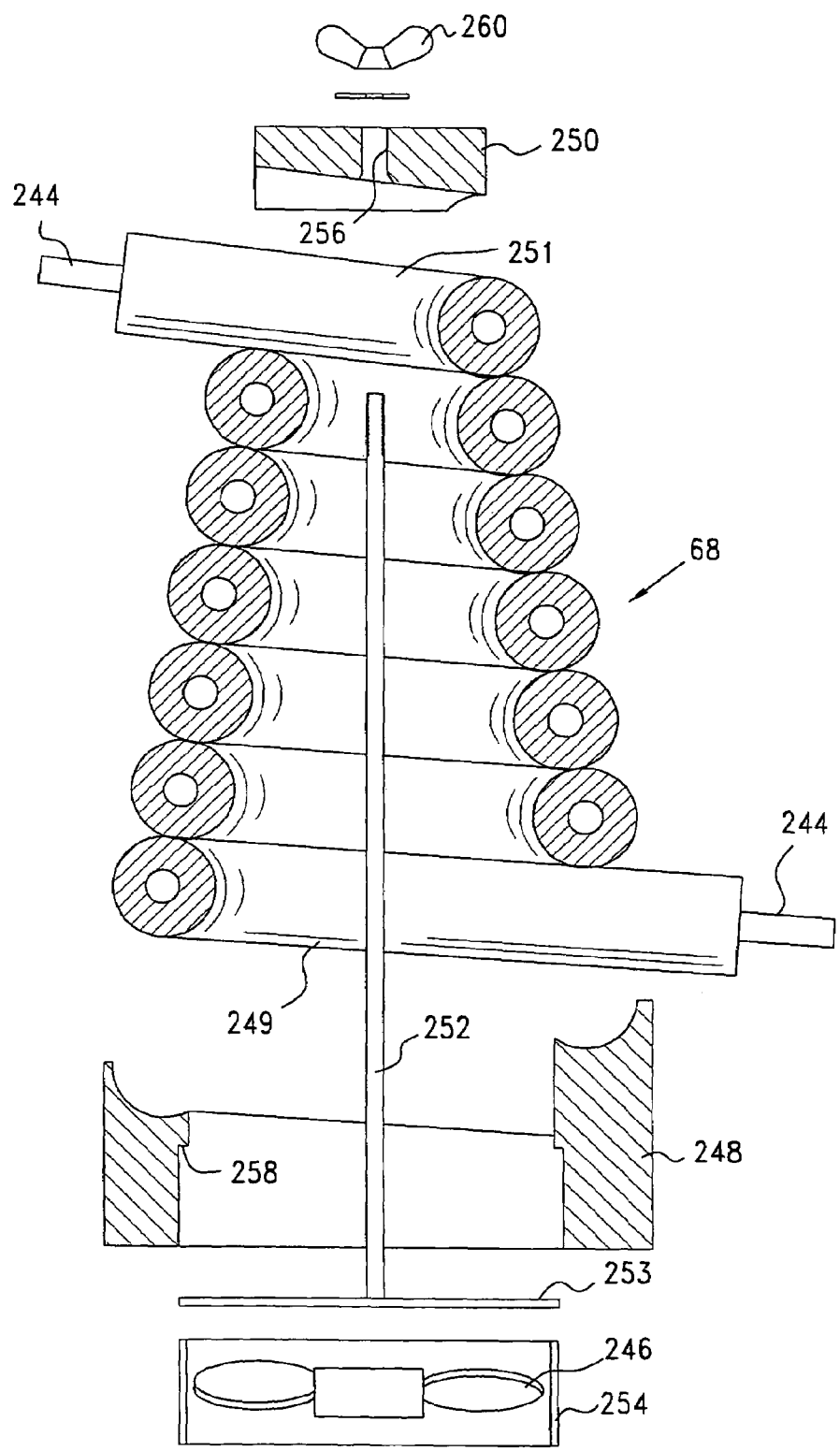

The preferred condenser 68 of the present invention is illustrated in greater detail in FIGS. 7 and 8. The condenser is a single finned tube 244 which is coiled to be cone shaped to provide maximum cooling efficiency, whereby cooling air from the fan 246 effectively engages the fins on the tubing to prevent wasted air flow.

The top of an annular formed rubber base 248 which surrounds the fan 246 matches the shape of, and receives, the bottom coil 249 of the condenser 68. Similarly, the bottom of a formed rubber cap 250 positioned on top of the condenser 68 matches the shape of the top coil 251 of the condenser. This ensures that all cooling air from the fan will pass symmetrically through the fins and around the tubing 244 of the condenser.

A tie rod 252, mounted by a spider 253 to the top of a housing 254 for the fan 246, protrudes vertically upwardly through the center of the condenser 68 and through a hole 256 in the center of the top cap 250. The housing 254 fits in, and engages a shoulder 258 on the interior of base 248, and a washer and wing nut 260 is threaded onto the top of the tie rod 252 to secure the unit.

The heat exchanger 49 (FIG. 4) incorporates an inner tube 270 which is open at each end, and a larger and somewhat shorter concentric outer tube 272 surrounding tube 270 and leaving short sections of tube 270 exposed at each end. Each end of tube 272 is sealingly closed around the circumference of tube 270, at 274 and 276, to create a chamber 280 between tubes 270 and 272. Chamber 280 has an inlet 282 at one end and an outlet 284 at the other end. Exchanger 49 may be fabricated from stainless steel tubing, and is preferably installed inline with vapor tube 64. The outlet line 44 from solenoid valve 36 is fluidly connected to inlet 282 of exchanger 49 and outlet 284 is fluidly connected to supply water to boiler 42, as by way of sensor inlet 46 (FIG. 3) or by way of a 'T' connector 290 of sensor 40, which is fluidly connected to sensor 40 by line 292 and to vessel 54 by line 48.

In operation, influent water from solenoid outlet 44 passes through chamber 280 of exchanger 49 by way of inlet 282 and outlet 284 then continues to the 'T' connector 290 and line 292 to sensor 40 and line 48 to the preheater chamber 170 between containers 52 and 54. The water that flows into container 52 where it is heated, and the vapor generated in vessel 52 passes through port 62 and vapor tube 64 toward condenser 68. The vapor passes through tube 270 of heat exchanger 49, in line with vapor tube 64, prior to entering the condenser 68. As the vapor passes through tube 270, a substantial amount of its heat is absorbed by the cold influent water passing through the chamber 280. Thus, the heat exchanger effects thermal energy recovery by transferring recovered heat energy back into the vessel 42 with the now-heated influent while substantially reducing ambient heat production.

Figure 9:
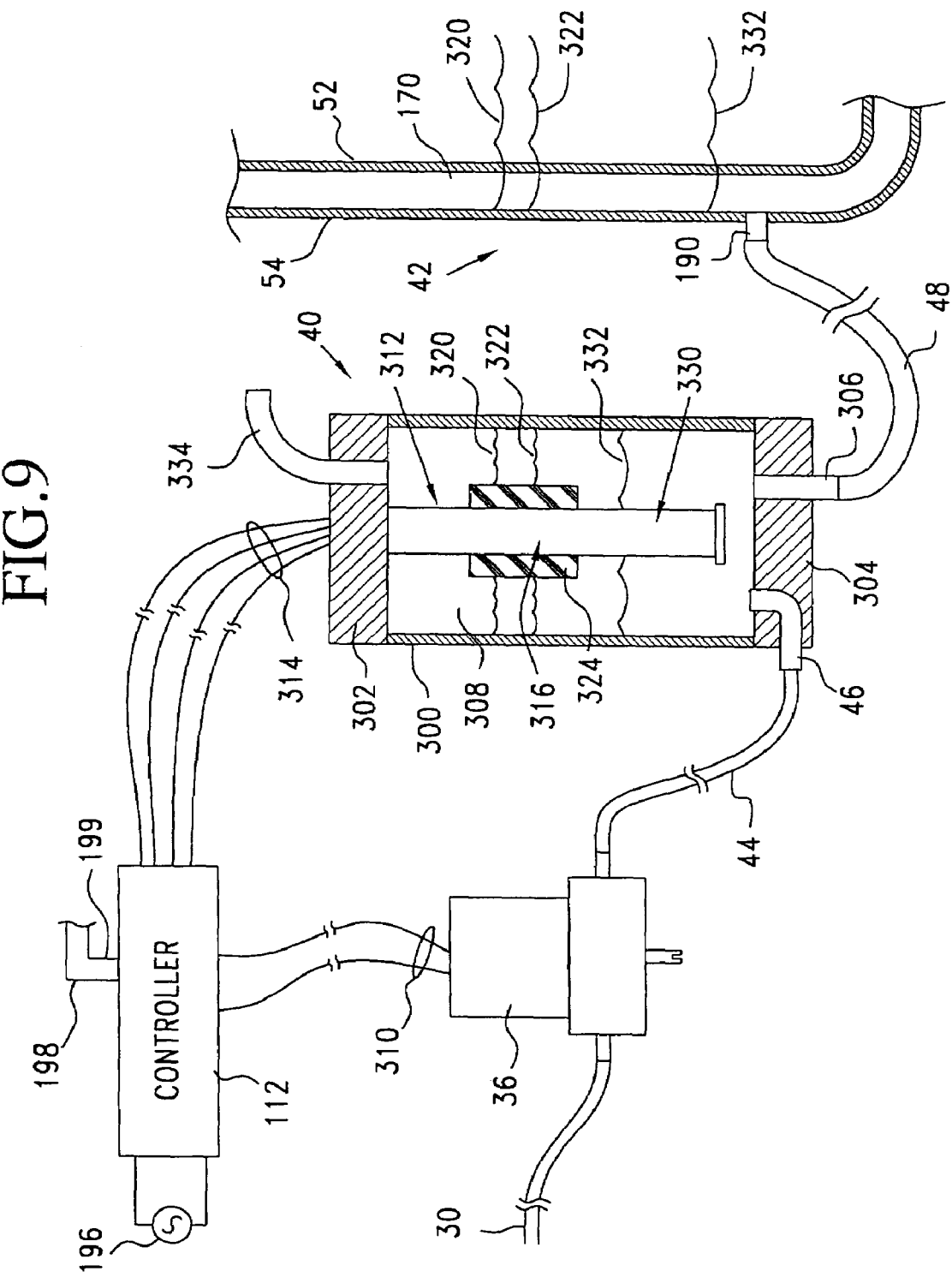
FIG. 9 is a diagrammatic front elevation view, in partial section, of a first embodiment of a noninvasive liquid level detector and controller which may be utilized in the distiller of the present invention.

A preferred embodiment of a noninvasive liquid level sensor and controller 40 in accordance with this invention is illustrated in greater detail in FIG. 9, to which reference is now made. As previously discussed, the detector 40 is a simple device for detecting, controlling and maintaining liquid levels within a container such as the boiler vessel 42, the sensor being usable with a wide variety of other containers or devices in which liquid levels are to be controlled. As illustrated, the sensor 40 is remote from the boiler vessel and is noninvasive; that is, it does not come into direct contact with the liquid contained in the inner container 52 and does not have to be removed from the inner container when cleaning is required. As a result, it is more reliable than other devices for liquid level controlling.

The sensor 40 includes a generally cylindrical body portion 300, a top closure or cap 302 and a bottom closure or cap 304. An outlet port 306 connects the interior 308 of the sensor to outlet line 48 which, in this embodiment, is connected through the side wall of outer container 54 to the interior preheater space 170 by way of inlet port 190, as previously described. The bottom closure 304 also includes the inlet port 46 which connects inlet line 44 from solenoid valve 36 (FIG. 1) to the interior 308 of sensor 40. The operation of solenoid 36 is regulated by controller 112, which is connected to the solenoid by way of cables 310.

Mounted in the interior of sensor 40 is a reed float switch assembly 312 which preferably is mounted on the top cap 302 and extends downwardly into the interior of the sensor. The switch assembly, which is conventional, and may be, for example, a switch available from KIP Inc., 72 Spring Lane, Farmington, Conn., includes reed switches at two levels, with the switches being connected to controller 112 by way of cables 314. The first level switch is located at a position generally indicated at 316, and the sensor 40 is mounted with respect to the boiler vessel 42 so as to position the first switch at the level associated with a desired liquid level range in the boiler vessel 42. Thus, this first-level switch is located so as to be sensitive to the preferred upper and lower water levels 320 and 322 to be maintained in the boiler vessel. Because the interior 308 of the sensor 40 is open to the interior of boiler vessel 42 by way of line 48, the liquid level in the detector will be equal to that in the boiler vessel, as indicated by levels 320 and 322 in the detector 40.

The reed switches are operated by a float 324 that is moveable with the water level in the sensor. When the water level reaches the lower level indicated at 322, the float activates the first reed switch located at 316, causing controller 112 to open solenoid valve 36. This allows water from supply 30 to flow through the sensor to the boiler vessel, restoring the water level to the desired upper level 320 and causing the reed switch at 316 to signal the controller to close the solenoid valve 36.

A second, or low level reed switch is provided at location 330 near the bottom of the sensor 40, and is responsive to float 324 to signal the controller 112 to shut off power to the heater 58 (FIG. 1), if for any reason the water in boiler vessel 42 drops to the predetermined low liquid level indicated at 332. A pressure equalizer tube 334 extends upwardly through top cap 302 to open the interior of the sensor to the ambient.

It will be noted that the diameters of ports 190 and 306 and of line 48 are greater than the diameter of inlet line 44 and port 46 to allow rapid flow of inlet water through the sensor 40 and into the boiler vessel 42 to prevent the detector from filling too quickly and prematurely operating the first level sensing switch. In a test of the illustrated system, the inlet line 44 had an inner diameter of 1/8" and the outlet line 48 had an inner diameter of 3/8". The solenoid valve flow regulator 36 was set to produce an incoming flow rate slightly greater than the consumption rate of the boiler vessel to produce a duty cycle in the solenoid valve of 2.6/hr during continuous operation of the distiller. For applications associated with a container which consumes liquid at a faster rate, the diameter of the detector body 300 may be larger, to permit use of a larger outlet line 48, and the flow regulator valve 36 would be set accordingly. It will be understood that the vertical positioning of the sensor 40 determines the desired liquid levels in the boiler vessel 42.

In operation, as the water in vessel 42 is consumed, the float 324 falls until it reaches the level indicated at 322, at which point the solenoid valve 36 cycles on to refill the vessel 42. As the water level in the vessel 42 rises, float 324 rises, and when it reaches the level indicated at 320, the solenoid valve 36 is turned off. As more water in vessel 42 is consumed, the float 324 once again falls until it reaches level 322, at which point the solenoid valve 36 cycles on again and vessel 42 is again refilled. Cycling between levels 320 and 322 maintains a predetermined substantially constant liquid level range in vessel 42. This range may be maintained within a fraction of an inch, if desired. By maintaining a constant predetermined liquid level range in vessel 42 the water temperature in container 52 (FIG. 1–3) will not fall below the boiling point during operation, so that the production of vapor and distillate is continuous. The pressure equalizer tube 334 maintains the space above the liquid level in sensor 40 at or near atmospheric pressure, permitting the free flow of liquid and permitting dependable operation of the reed float switch assembly.

If for any reason the liquid from supply 30 fails, so that the level in vessel 42 falls to a predetermined low liquid level such as that indicated at 332, then the switch at level 330 signals the controller 112 to shut off power to the heater 58 (FIG. 1–4). If desired, the switch at 330 may also activate an alarm or other signaling device to warn of a system failure. If desired, the body 300 may be translucent to permit visual observation of the liquid level in the sensor.

Figure 10:
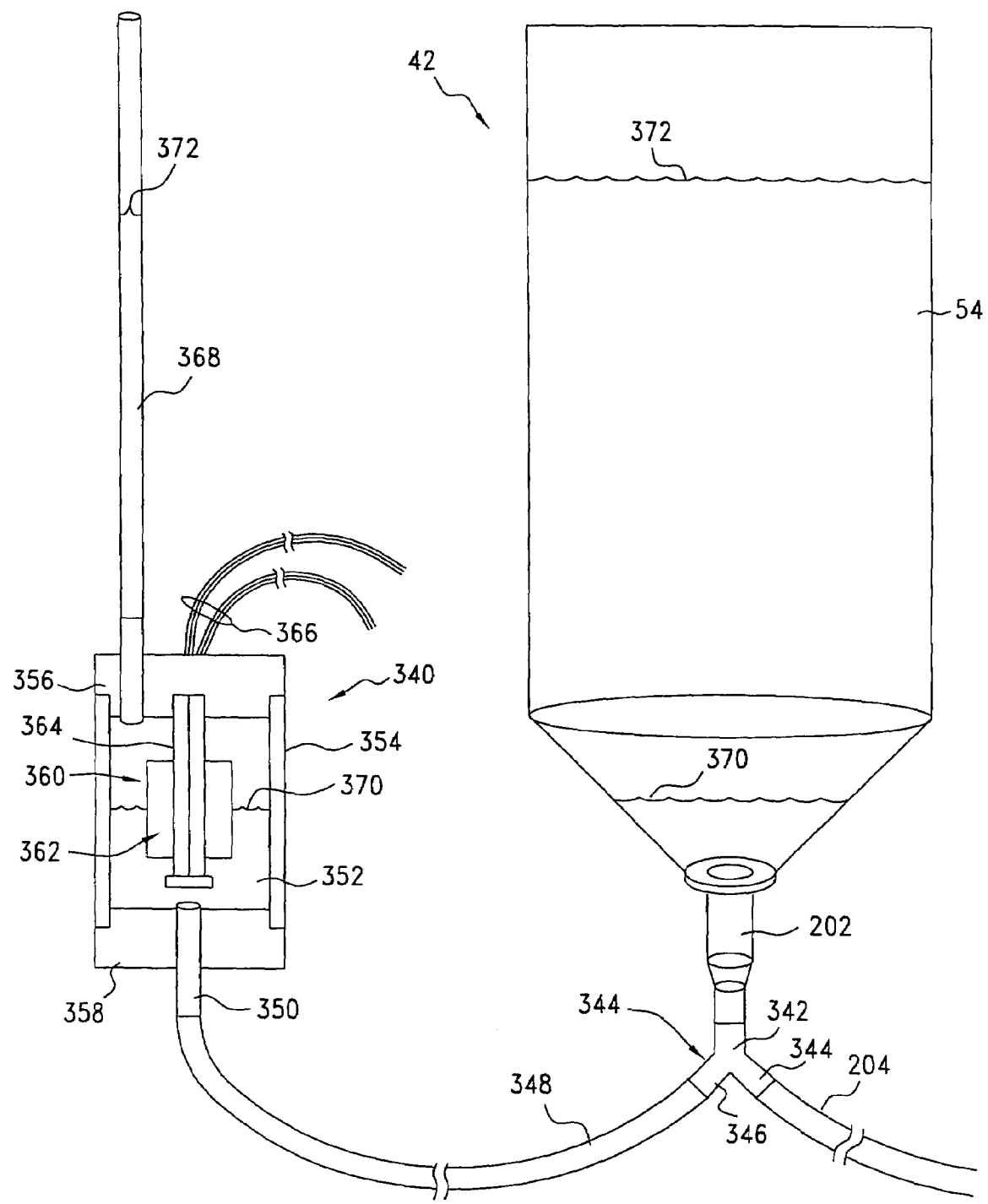
FIG. 10 is a diagrammatic partial front elevation of a second embodiment of the liquid level controller and detector of FIG. 9.

A modified version of the sensor system of FIG. 9 is illustrated in FIG. 10, to which reference is now made. In this embodiment, a noninvasive liquid level sensor and controller 340 is connected to the outer container 54 of boiler vessel 42 by way of the outlet port 202 illustrated in FIG. 5. The outlet port 202 in this case is connected to a common leg 342 of a "Y" fitting 344, with a second leg 344 of the fitting being connected to the drain line 204. A third leg 346 of the "Y" fitting is connected through water line 348 to an inlet port 350 leading to the interior 352 of the sensor 340. As illustrated, the sensor 340 includes a cylindrical body 354 which is closed at its upper end by a top cap 356 and at its lower end by a bottom cap 358. The inlet port 350 extends through bottom cap 358 to the interior of the body portion, while a conventional reed float switch 360, including a float 362 and a corresponding reed switch (not shown) located within a support tube 364, is suspended from the top cap 356. Wires 366 extend from the reed switch through the top cap and are connected to a controller 112 such as that previously described. Also passing through the top cap 356 is a vent tube 368, which extends upwardly above the maximum level of liquid to be provided in the container 42.

It will be understood that the line 348 leading to the detector 340 is connected to the "Y" fitting of a bottom-draining container for illustrative purposes, and that this tube may be connected at or near the bottom of the container being monitored in any desired manner.

The sensor 340 may be mounted to a frame or a platform (not shown) associated with the vessel 42 which is to be monitored, with the vertical positioning of the detector being such that the level detecting mechanism of the float switch assembly 360 will detect a predetermined empty condition or a low liquid level, indicated at 370 in vessel 42 and in the sensor 340. The vent tube 368 extends above the desired uppermost fill level 372 of the vessel, indicated in the vessel and in the tube 368. It will be understood that the body 354 and the tube 368 may be translucent to permit direct observation of liquid level in the vessel 42.

As liquid is removed from the vessel 42, either through evaporation in the manner described above or through draining of the container through drain 204, the liquid level in sensor 340 and vent tube 368 is lowered to the same level as that in vessel 42. When the liquid level reaches the predetermined empty or low level 370, the switch mechanism of the reed float switch assembly 360 may signal an alarm or activate the controller to refill the vessel, as desired.

Figure 11:
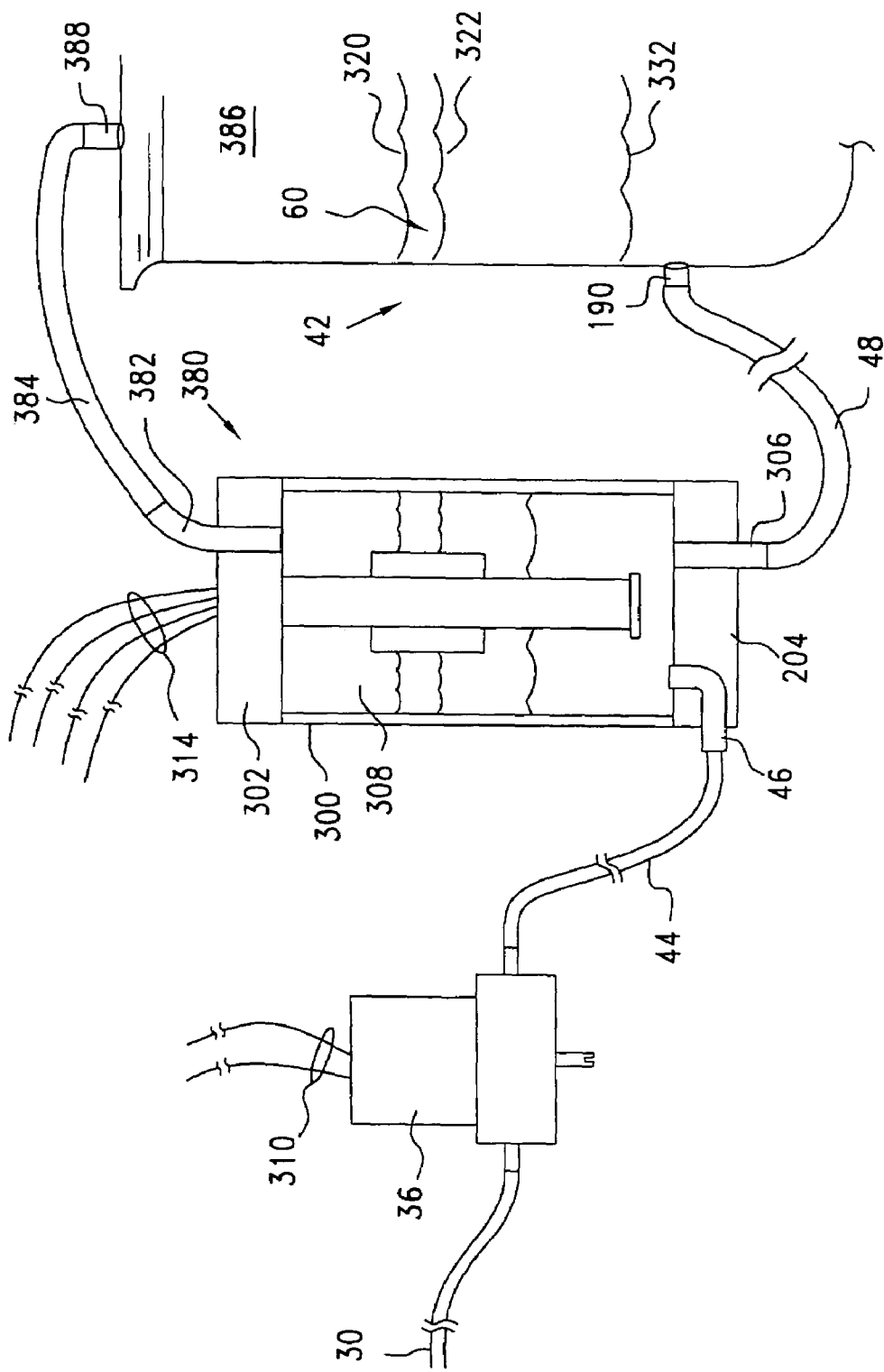
FIG. 11 is a diagrammatic, partial elevation view, in partial cross section of a third embodiment of the device of FIG. 9.

A third embodiment of the noninvasive liquid level sensor controller detector of the present invention is illustrated at 380 in FIG. 11. This sensor is useful for noninvasively controlling, maintaining and detecting desired predetermined liquid levels in an associated vessel such as the boiler vessel 42, as discussed above, but in this case, the sensor 380 is used in association with a vessel or container which operates at pressures other than atmospheric. The illustrated device is similar to that illustrated in FIG. 9, and accordingly similar elements carry similar reference numerals. In this case, however, the vent tube 334 of the device of FIG. 9 is replaced by a pressure tube connector 382 which extends through the top cap 302 of sensor 380 and is in communication with the interior 308 of the body 300. The connector 382 is connected by way of pressure equalizer tube 384 to the uppermost portion 386 within vessel 42, above the upper level 320 of the liquid 60 within the vessel, by way of a connector 388 which forms a port in the cover or lid on top of the vessel 42. The tube 384 equalizes the pressure of chamber 386 with the air space above the liquid level in the interior 308 of sensor body 300, thus permitting the level detector to operate dependably.

Figure 12:
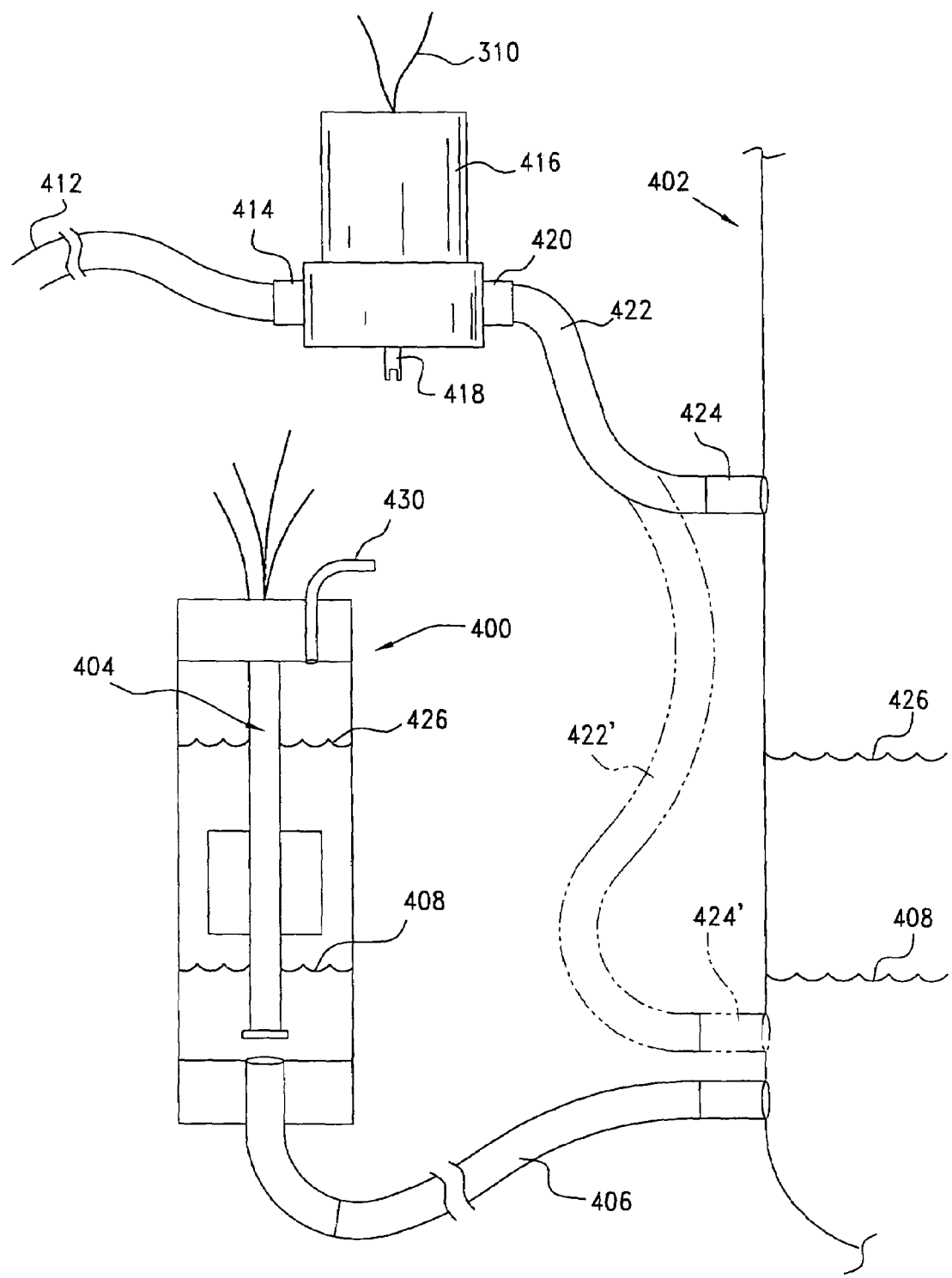
FIG. 12 is a diagrammatic partial view in partial cross section of a fourth embodiment of the liquid level sensor and controller of FIG. 9.

A fourth embodiment of the liquid level sensor of the present invention is illustrated in FIG. 12, to which reference is now made. In this embodiment, a level sensor and controller 400 is associated with a vessel or container 402, which may be the boiler vessel 42 of the present invention. This embodiment differs from that of FIGS. 9 and 11 in that it permits a rapid flow rate for the introduction of liquid into the vessel 402, and is also suitable for use when the supply liquid is to be introduced into the vessel above the liquid level within the container. In this embodiment, the sensor 400 is similar to that of the previous figures and includes a two-level reed switch assembly 404, similar to that illustrated at 312 in FIG. 9., and a connector line 406 which connects the bottom of the sensor 400 to the bottom of vessel 402, so that the sensor 400 and the vessel 402 are interconnected at locations below the desired minimum water level 408. The sensor is vertically aligned with vessel 402 so that the reed switch assembly 404 will detect the desired water levels, as previously described.

A liquid supply line 412 is connected to the input 414 of a solenoid valve 416, which includes a flow regulator 418 with the output 420 of the solenoid being connected by way of a feed line 422 to an inlet port 424 in vessel 402. The inlet port 424 may be located above the maximum desired level 426 of the liquid in the vessel 402. Alternatively, the feed line may be connected below the minimum water level 408, as indicated in dotted line by feed line 422' and inlet 424'.

The sensor 400 may include a vent tube 430, such as that illustrated at 334 in FIG. 9, or may incorporate a pressure equalizing tube such as the tube 384 in FIG. 11, as desired.

The operation of the embodiment of FIG. 12 is similar to that of the previously described embodiments, except that liquid enters the container 402 directly through the valve 416 and feed line 422, instead of by way of the interior of the sensor 400. This allows a more rapid transfer of fluid into the container 402 and serves to reduce the duty cycle of solenoid valve 416.

Figure 13:
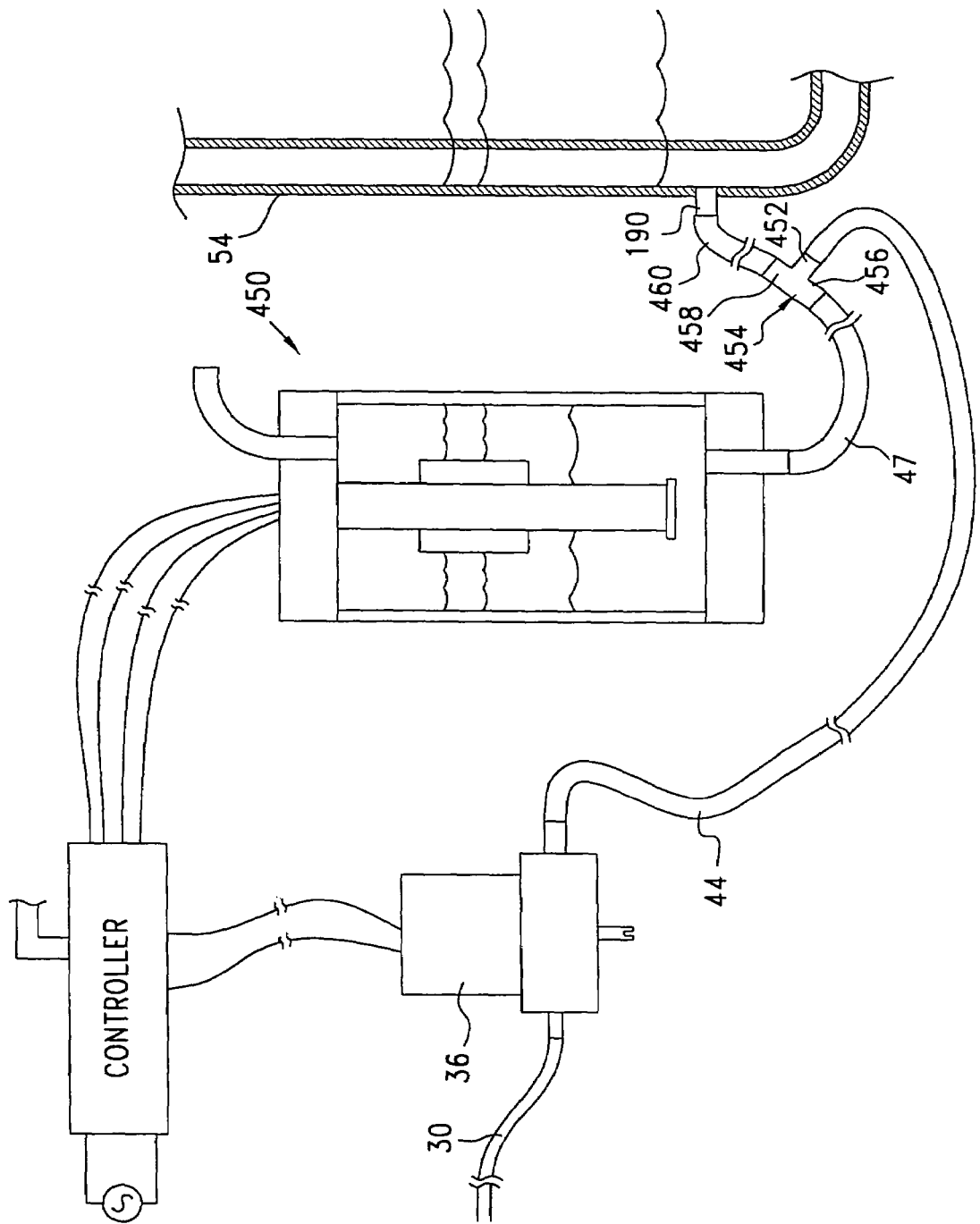
FIG. 13 is a diagrammatic, partial elevation view, in partial cross section of a fifth embodiment of the liquid level sensor and controller of FIG. 9 which may be utilized in the device of FIG. 1.

A fifth embodiment of the noninvasive liquid level sensor and controller of the present invention is illustrated in FIG. 13, to which reference is now made. The sensor 450 of FIG. 13 differs from the embodiment illustrated in FIG. 9 only in that water from solenoid outlet line 44 does not travel through sensor 450 but rather to an inlet 452 of a 'T' connector 454, then to sensor 450 by way of 'T' outlet 456, and to vessel 54 through 'T' outlet 458 and line 460. This embodiment may be particularly suitable when the heat exchanger 49 (FIG. 4) is utilized to avoid a potential increase in the cost of materials needed to allow the sensor 450 to accommodate heated influent water from the heat exchanger.

Figure 14:
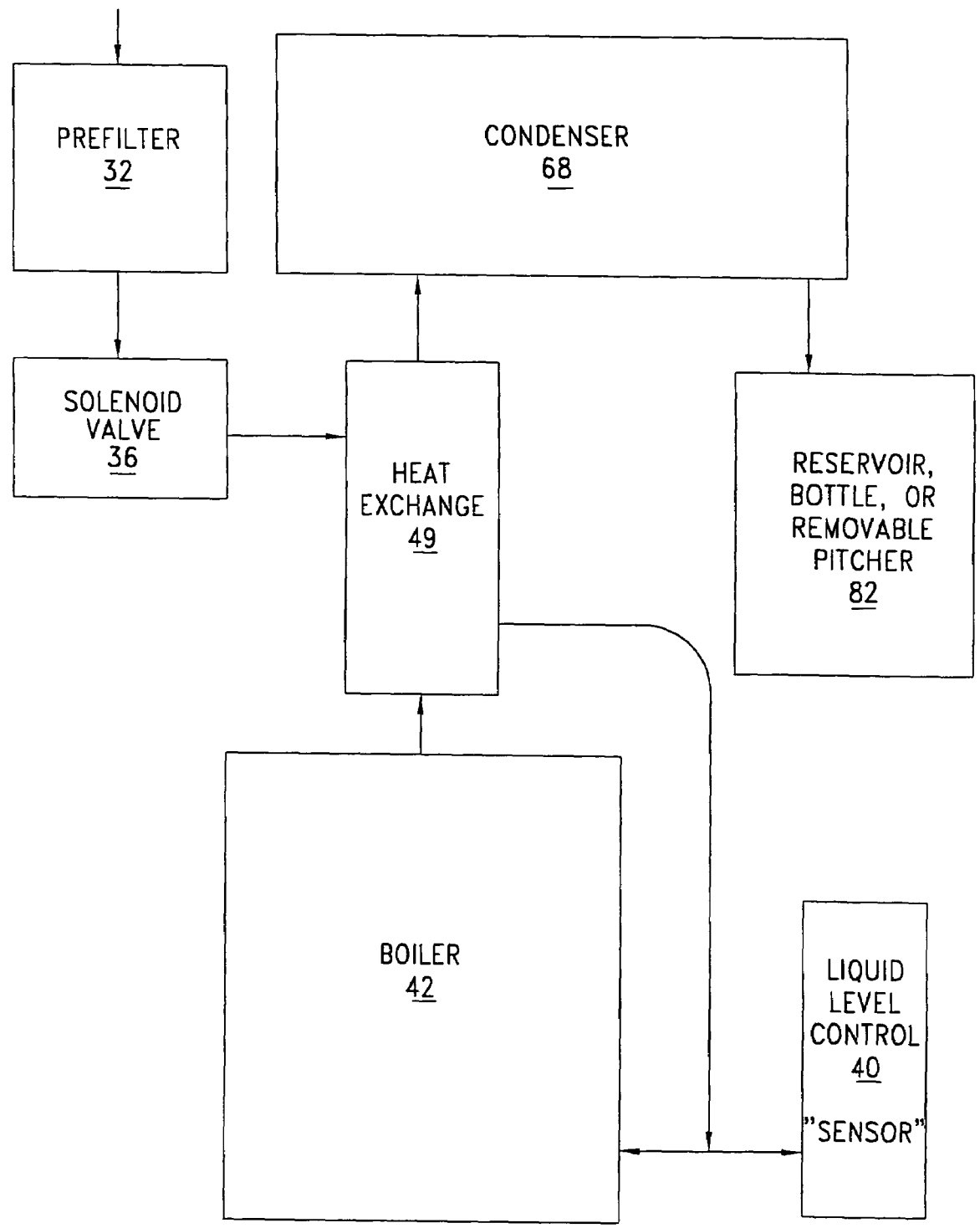
FIG. 14 is a diagrammatic illustration of the components of the invention.

The water treatment process of the present invention as described above is illustrated diagrammatically in FIG. 14, wherein raw water to be treated passes through pre-filter 32, solenoid valve 36, and through heat exchanger 49 to boiler 42 and to sensor 40. At the same time, vapor from boiler 42 passes though heat exchanger 49 and condenser 68 and is dispensed into a removable pitcher, bottle, or reservoir 82.

Figure 15:
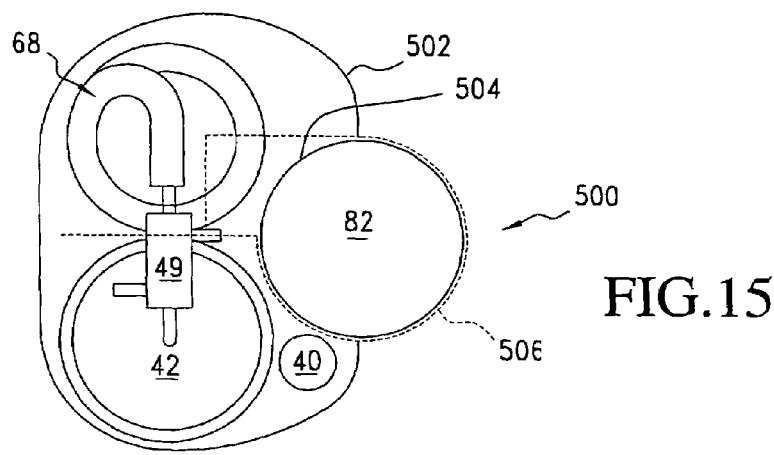
FIGS. 15, 16, and 17 illustrate, in diagrammatic form, partial top and left and right side views of a continuous distillation embodiment of the present invention which may be suitable for use as a countertop distiller.
Figures 16, 17:
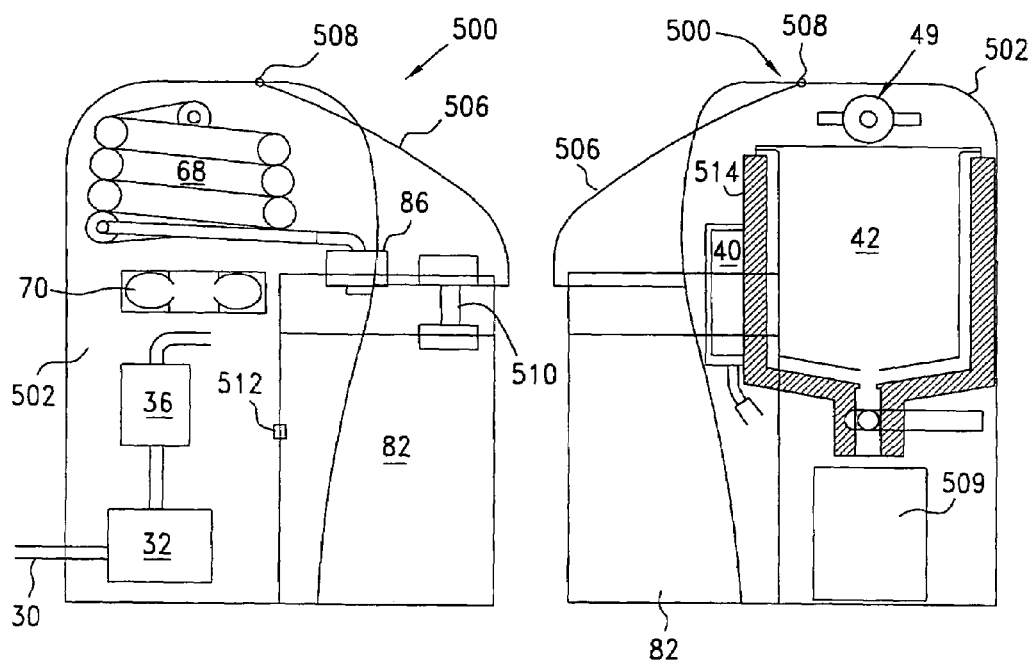

FIGS. 15–17 are partial top and left and right side views with selected portions removed of another embodiment of the distiller of the invention, wherein the various components are configured to provide a low profile, compact continuous flow distiller unit 500 suitable for use, for example, on a counter top.

In this embodiment, the distiller includes the various components described above with respect to FIGS. 1 and 14, and such components are similarly numbered for convenience, although it will be understood that the details of component shapes may vary from those previously illustrated.

The unit 500 includes a housing 502 surrounding the boiler 42 and condenser 68, and providing a front recess 504 for receiving a reservoir 82. The housing carries a hinged lid 506 which is mounted on the housing by a hinge 508 and which extends over the reservoir 82. The boiler 42 is removed from the illustration of FIG. 16, to show the relative locations of the filter 32 and the solenoid valve 36 with respect to the condenser 68, while the condenser 68 is removed from the illustration of FIG. 17 to show the relative locations of the liquid level control 40 and a boiler drain cup 509 with respect to the boiler 42.

In the counter top configuration illustrated in these figures, a float switch 510 may be secured to the hinged cover 506 to detect when the reservoir 82 is full, and a safety switch 512 may be located on the housing 502, preferably in recess 504, to detect the presence or absence of the reservoir. These two switches 510 and 512 preferably are connected to the control circuit 112 to shut off power to the heater in boiler 42 when the reservoir is not in place or when the reservoir is full.

As illustrated in FIG. 17, the boiler 42 may be enclosed in an insulating blanket or layer 514 to increase the efficiency of the device. It is also noted that in this embodiment, as in all the others described herein, at least a portion of the housing is removable to provide access to various distiller components for service and maintenance. In the configuration of FIGS. 15–17, some of the components are accessible through the hinged lid 506. It will also be understood that more than one pitcher or bottle (reservoir) may be provided so a full one can be placed in a home refrigerator while another one is being filled. In this way a continuous supply of pure chilled drinking water is always available.

Figure 19:
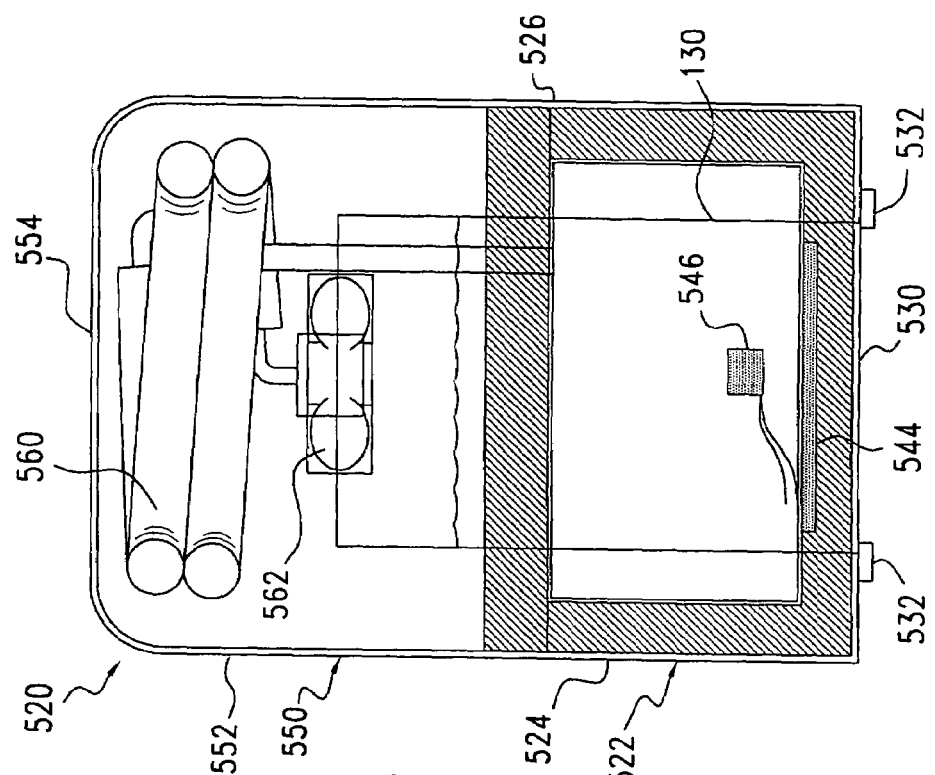
FIGS. 18 and 19 illustrate a portable batch distiller in accordance with another embodiment.
Figure 18:
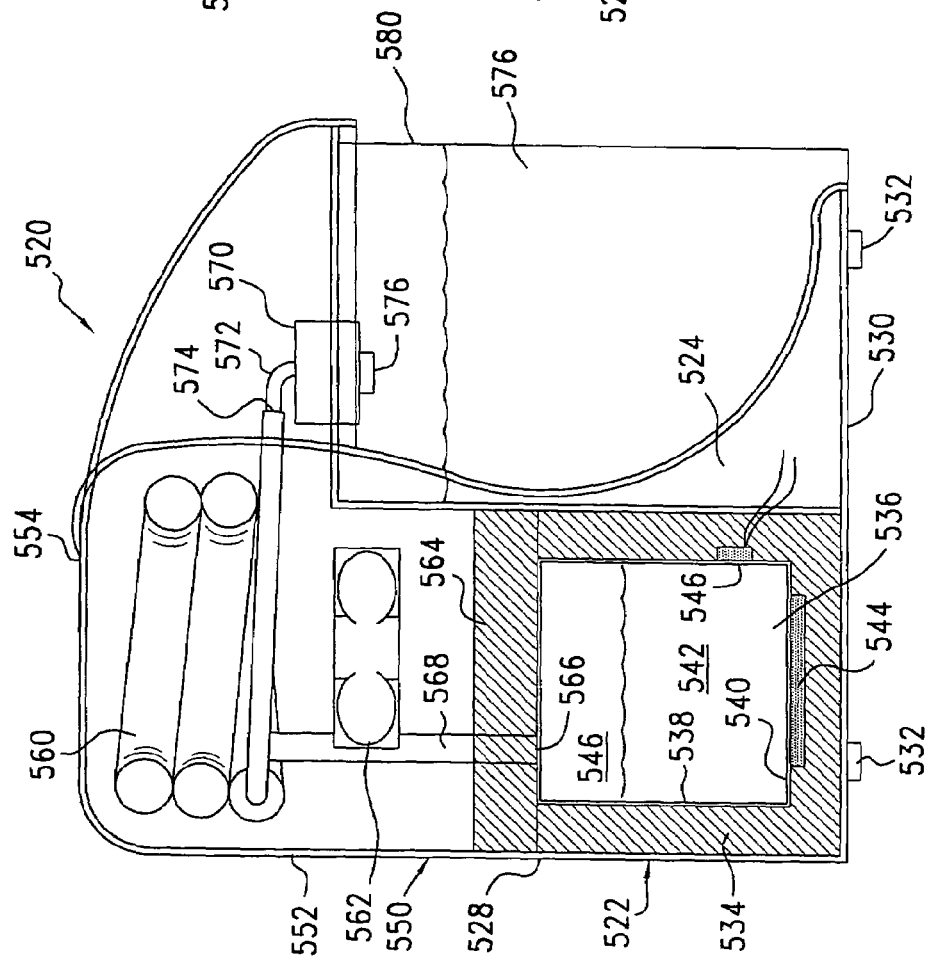

Another distillation apparatus according to the invention is generally indicated diagrammatically at 520 in FIGS. 18 and 19 as a portable batch distiller which includes a base housing 522 having side walls 524 and 526, a back wall 528 and a bottom wall 530 with feet 532. An insulated boiler pocket 534 is mounted in housing 522 to receive a removable, open-top boiler 536 having side walls 538 and bottom wall 540. Boiler 536 receives raw water 542 to be heated. A hot plate 544 is provided in the bottom of pocket 534 to heat the raw water for producing vapor in a vapor chamber 546 above the surface of the water. A heat sensor 546 is provided for shutting off power to hot plate 110 when a predetermined increase in temperature is sensed.

The housing includes, in this embodiment, a top, or cover portion 550 having side walls 552 and a top wall 554 which is removable from base housing 522 for providing access to boiler 536 to fill it with the raw water 542 and for removing the boiler for easy cleaning or replacing. Mounted within top housing 550 is a condenser 560 for condensing vapor from chamber 546 into pure water, a fan 562 for cooling the condenser 560, and a lid 564 for sealingly closing boiler 536 when top housing 550 is placed in position on top of base housing 522. Lid 564 incorporates a vapor port 566 which is operably attached to condenser 560 by vapor tube 568.

A carbon filter 570, for enhancing the taste of purified water flowing from condenser 560, has an inlet 572 removably attached to a distillate outlet 574 of condenser 560, and has an outlet 576 for delivering filtered water to a bottle or pitcher 580 which is removably positioned on a portion of the housing bottom wall 530 below carbon filter 570.

In operation of the batch distiller 520, a predetermined volume of raw water 542 is introduced into boiler 536 and top housing 550 is placed in position on top of base housing 522. Water 542 is heated by hot plate 544, which produces vapor in chamber 546. The vapor rises into the condenser 560 by way of vapor port 566 and tube 568, where it is condensed into pure water. The pure water flows by gravity from condenser 560, through removable carbon filter 570, and into bottle 580. The end of production of pure water is controlled by the heat sensor 546, which senses a rise in temperature to shut off power to the hot plate.

Figure 20:
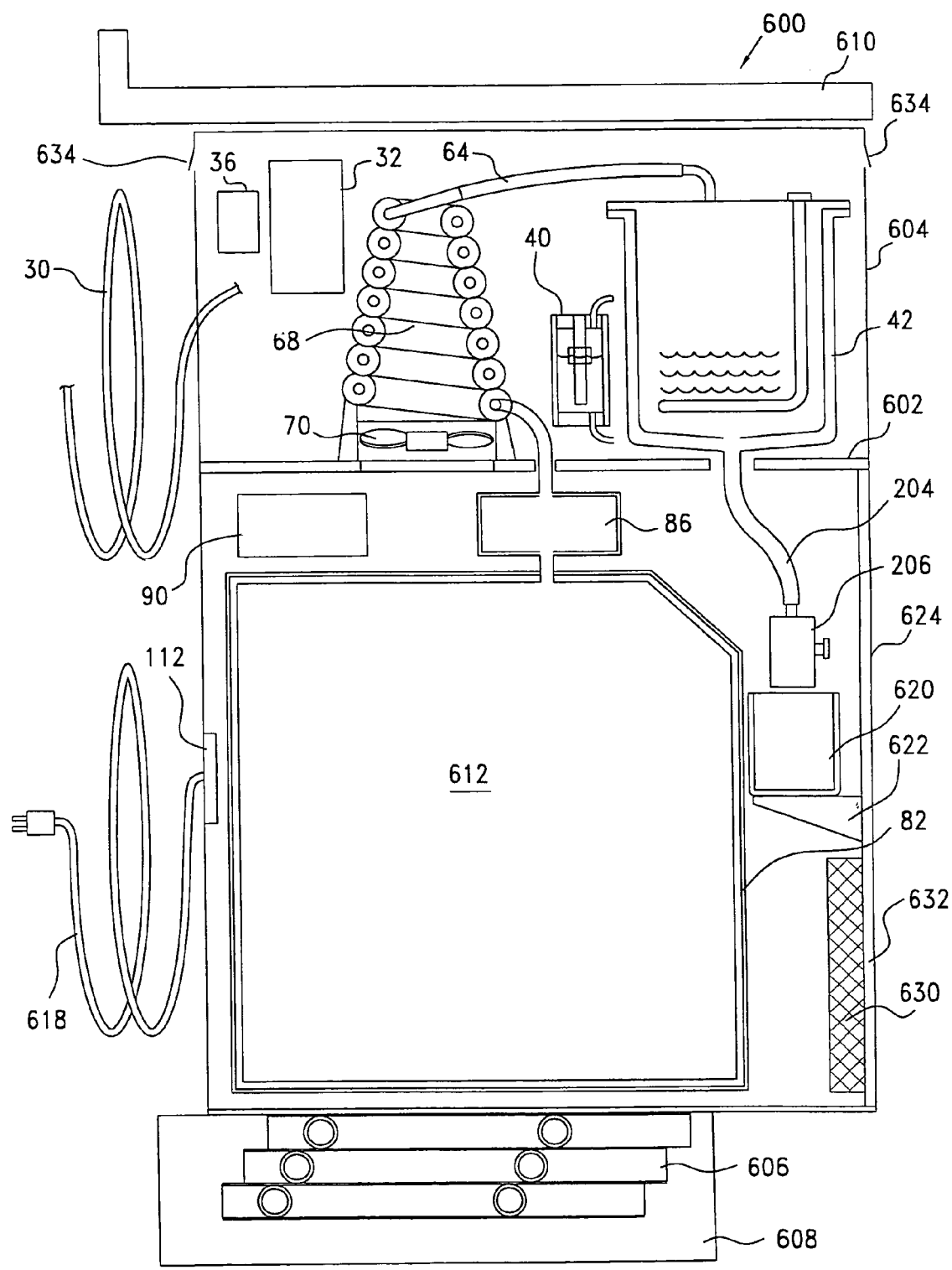
FIGS. 20, 21, and 22 diagrammatically illustrate side, top, and front views, respectively, of a compact distiller suitable for under counter installations.
Figure 21:
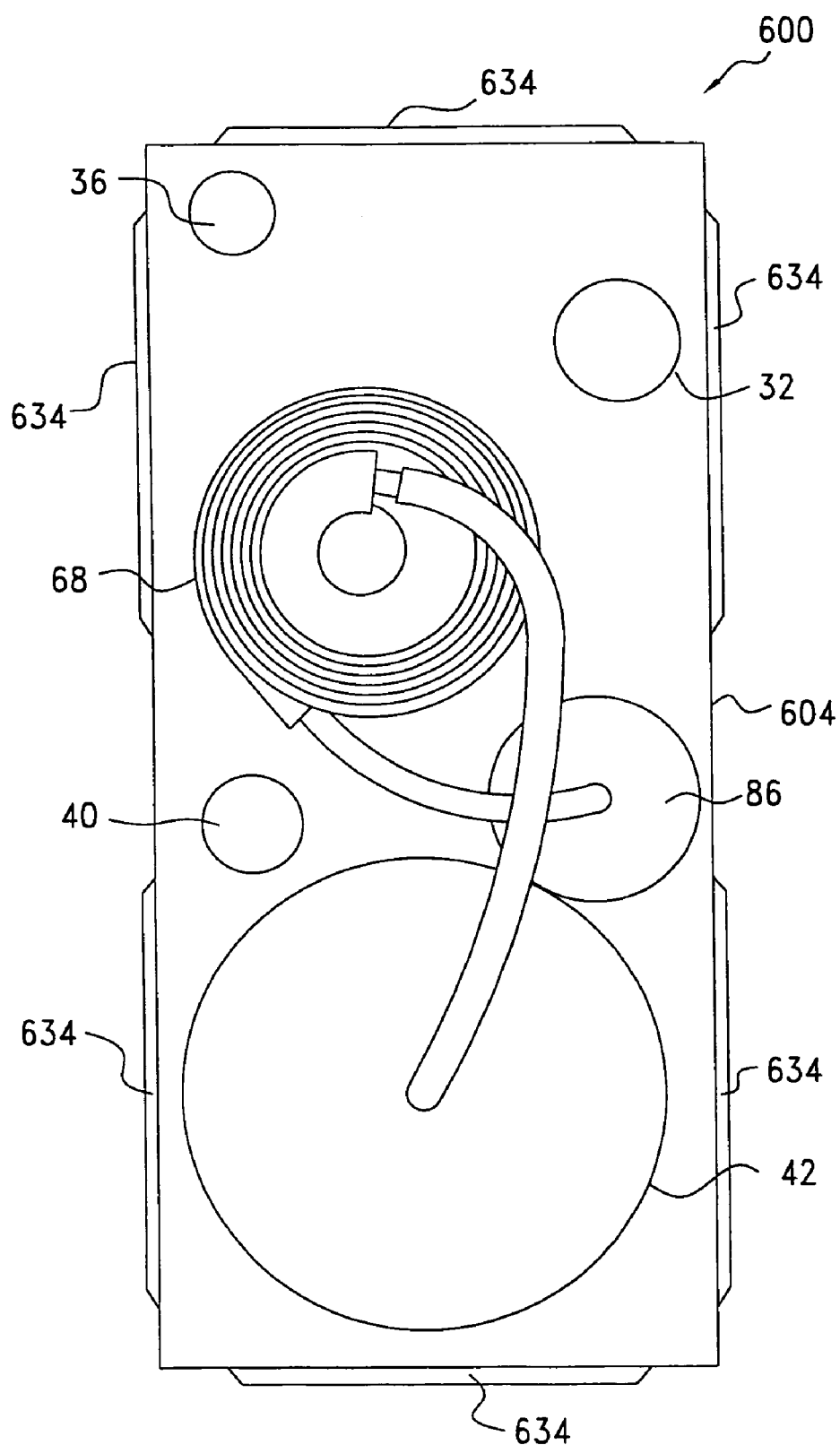
Figure 22:
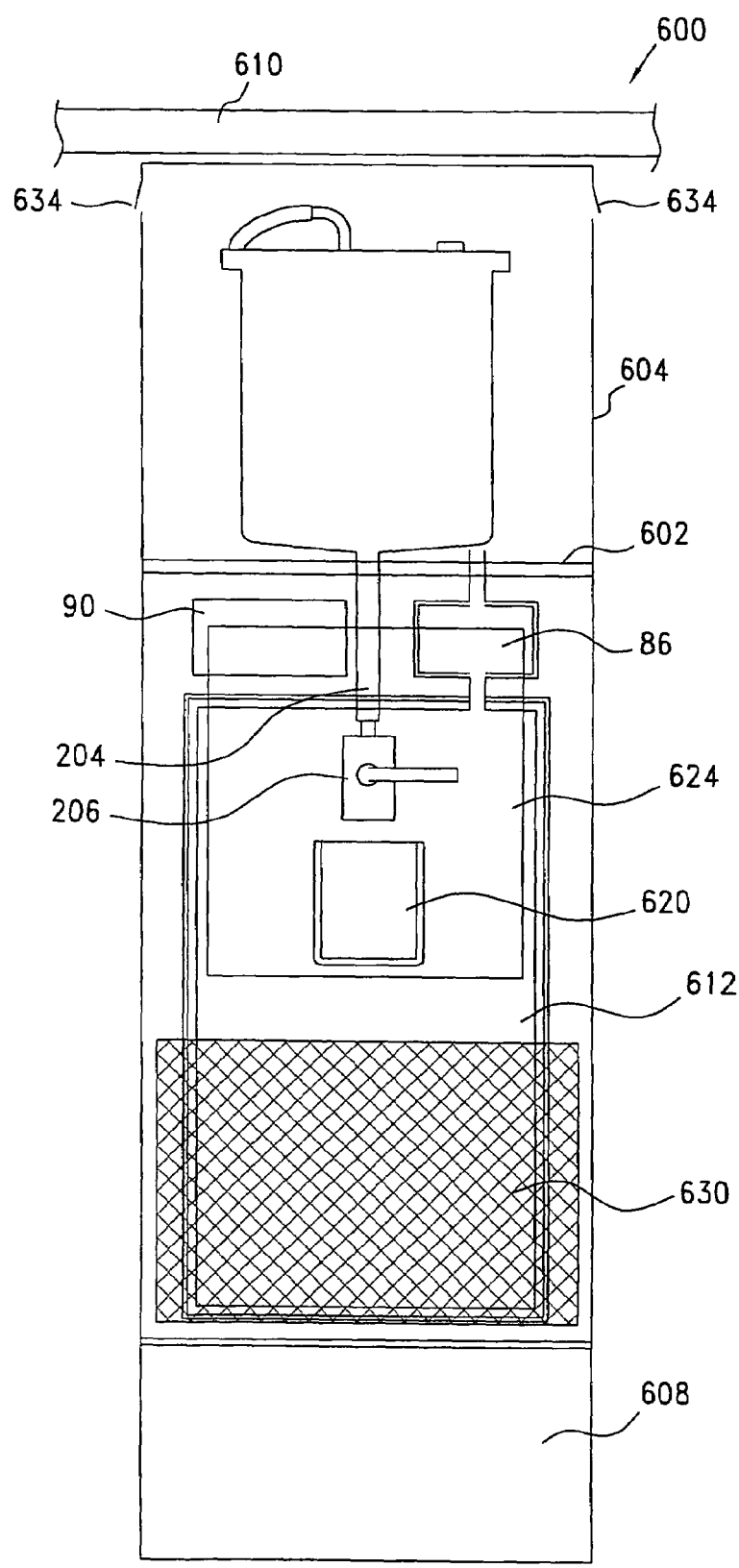

Still another embodiment of the distiller of the present invention is in the form of a new compact consumer appliance, illustrated at 600 in FIGS. 20, 21 and 22, which may be configured for installation under a counter in similar manner as a compact dishwasher or trash compactor, preferably is narrow and deep to minimize the space required. The under-counter distiller unit 600 incorporates many of the components described above with respect to FIGS. 1–4, and similar components are similarly numbered for convenience. Thus, the unit 600 includes a boiler 42, and a condenser 68 cooled by a fan 70 connected by line 64 to receive vapor from the boiler. Water is supplied to boiler 42 from inlet line 30 through prefilter 32 and solenoid valve 36, and the level of water in the boiler is controlled by a level sensor 40.

These components are mounted on a support platform 602 secured in a narrow, deep housing 604 which may, in turn, be mounted on suitable rollers 606 in a roller housing 608. The roller housing positions the distiller unit at its desired location, under a counter 610, for example, while the rollers allow it to be moved forwardly out from under the counter, for access to the components for servicing and replacement.

Also located in housing 604, beneath the support platform 602, is the reservoir 82, which receives distilled water 612 from the condenser 68 by way of filter 86. A pump 90 delivers water from the reservoir, upon demand, to a sink faucet, refrigerator ice maker, or to other locations, under the control of the control circuit 112, described above, which may be powered by a suitable power source through cord 618. To permit cleaning or replacement of the boiler 42, the boiler drain line 204, described with respect to FIG. 5, is connected through a valve 206 to a drain cup 620 supported in housing 604, for example, on a platform 622. This drain cup may be reached through a suitable access panel in the front or side of housing 604.

Air flow through the distiller housing is by way of a replaceable air inlet filter 630, which preferably is mounted in an opening 632 in the front of housing 604, and air vents 634 at the top of the housing. The filter provides the dual purposes of protecting internal components from dust and of purifying the ambient room air.

Figure 23:
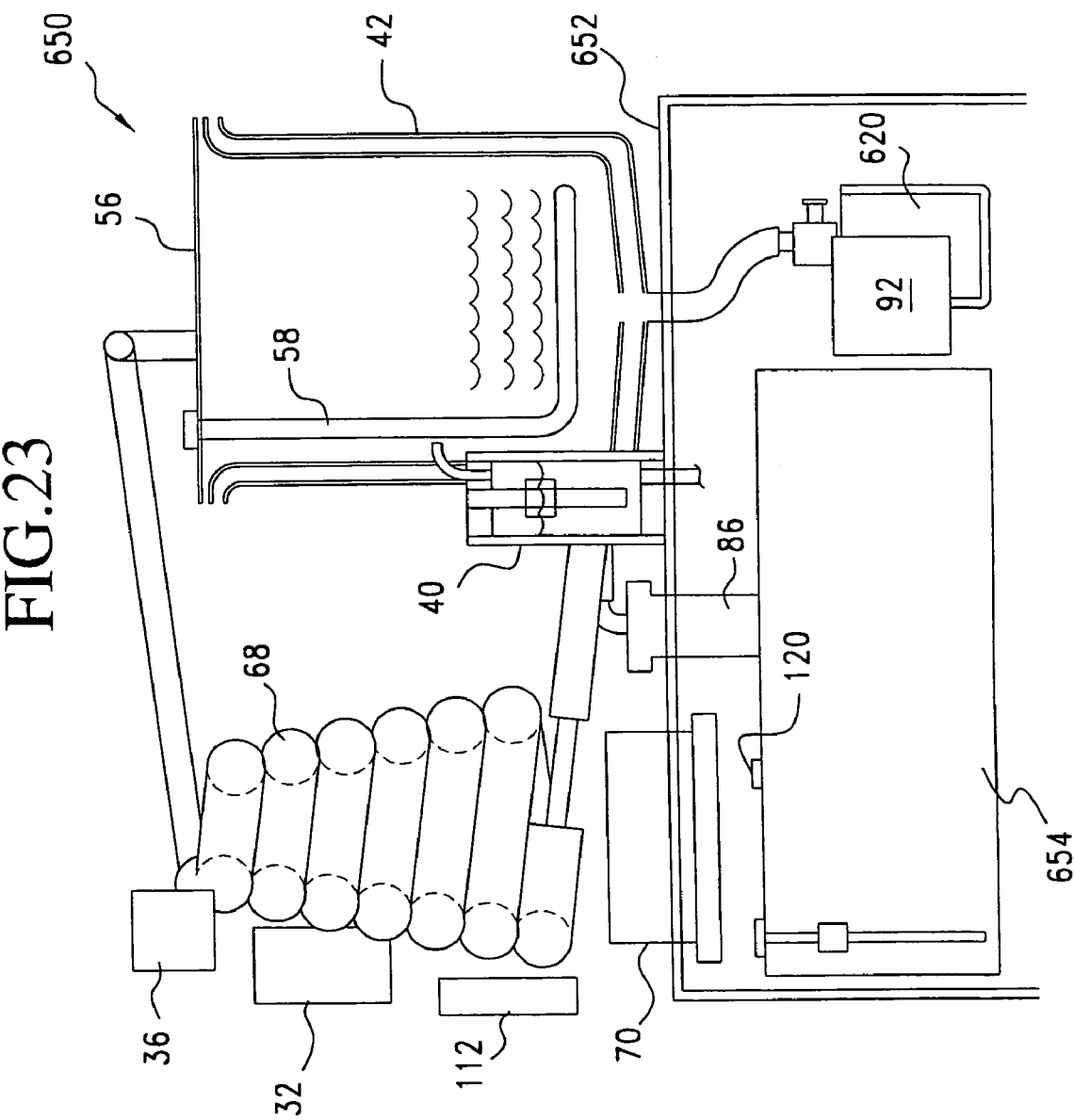
FIGS. 23, 24 and 25 diagrammatically illustrate side, top and end views, respectively, of a compact distiller suitable for under sink installations.
Figure 24:
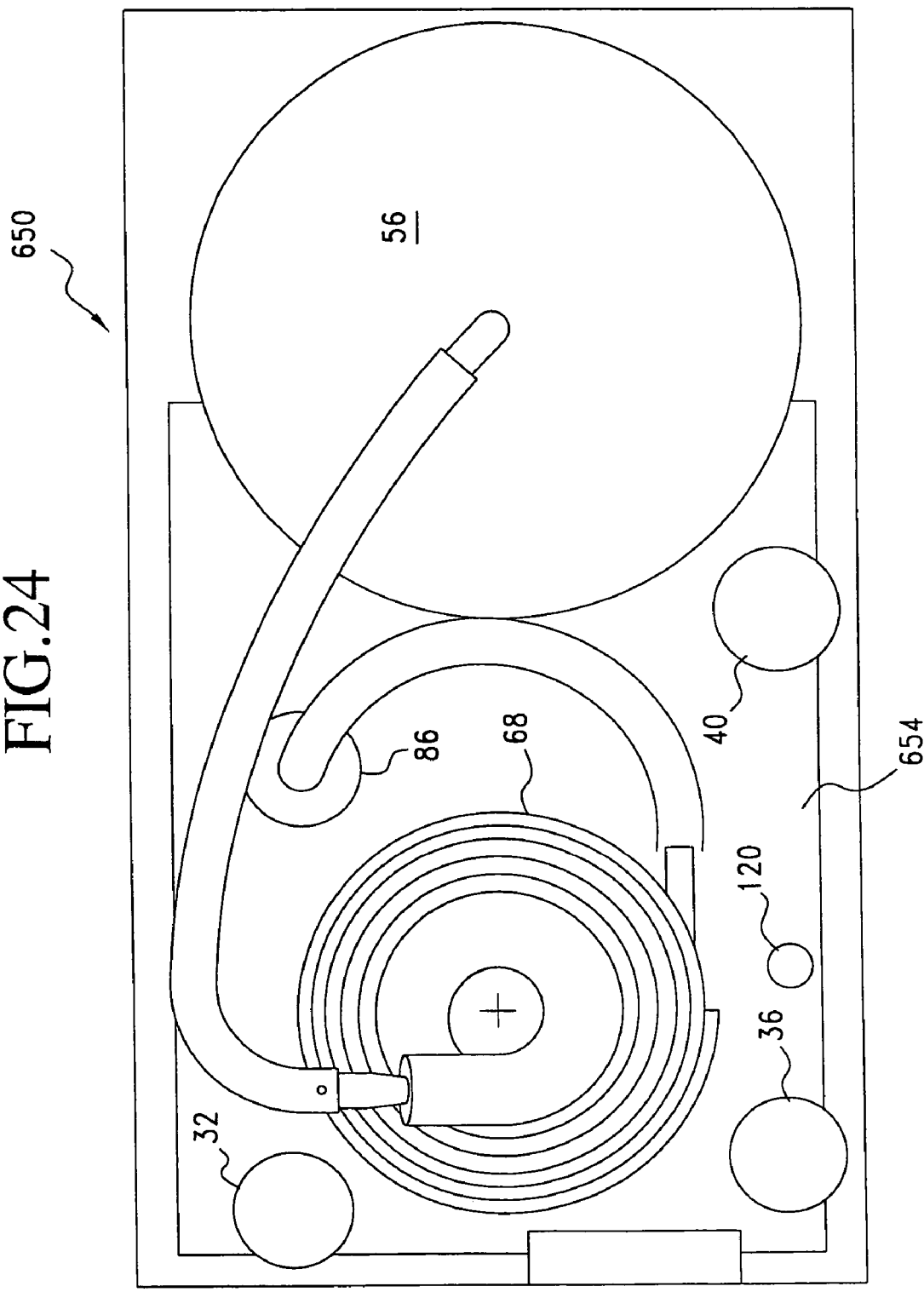
Figure 25:
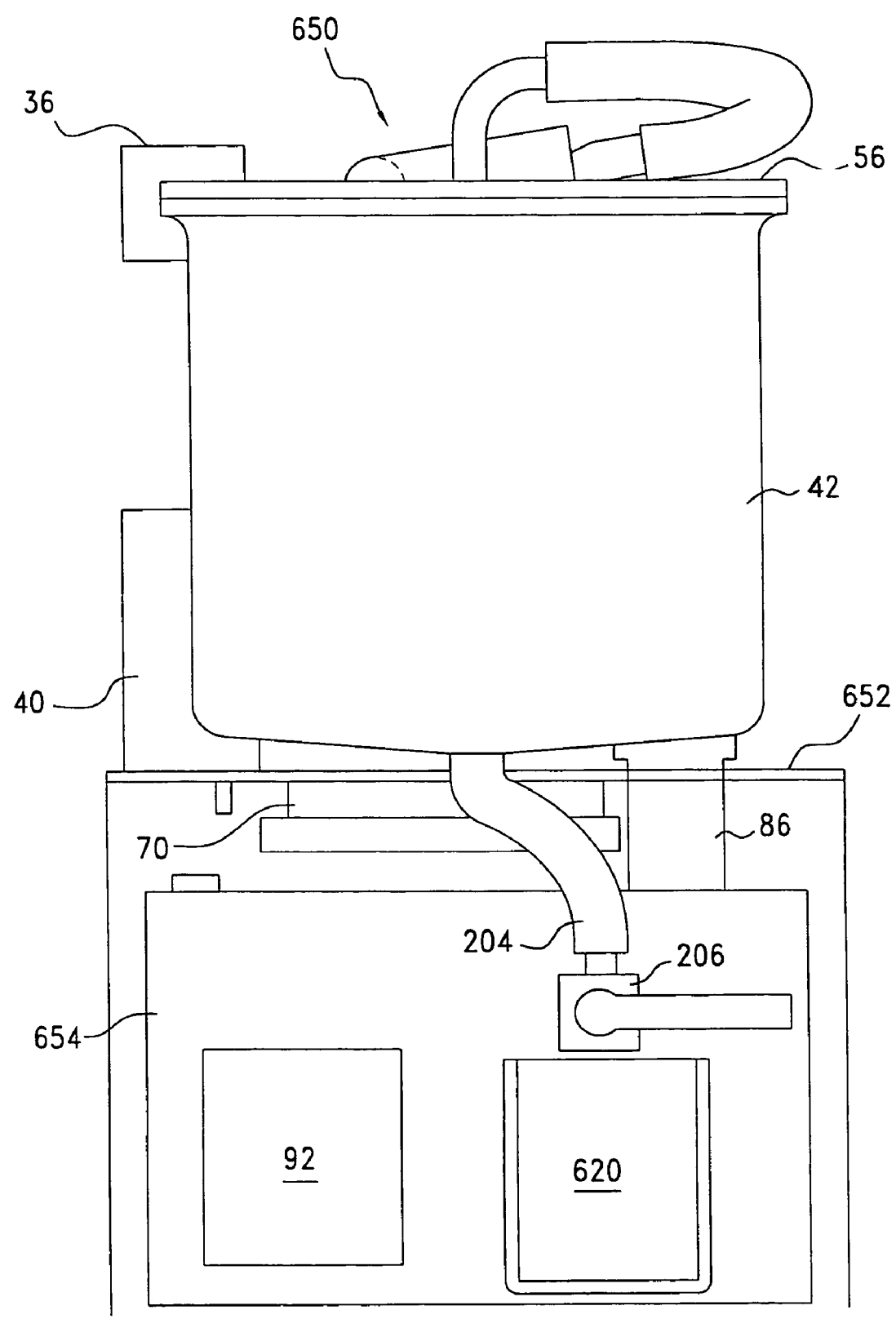

FIGS. 23, 24 and 25 illustrate at 650 a further modification of the distiller of the invention, suitable for use under a kitchen sink, or similar location. The under-counter distiller unit 650 incorporates many of the components described above with respect to FIGS. 1–4, and similar components are similarly numbered for convenience. Thus, the unit 650 includes a boiler 42 and a condenser 68 cooled by a fan 70 connected by line 64 to receive vapor from the boiler. Water is supplied to boiler 42 from inlet line 30 through prefilter 32 and solenoid valve 36, and the level of water in the boiler is controlled by a level sensor 40.

These components are mounted on a support platform 652 secured in a shortened housing (not shown) to enable it to be mounted in a small area such as that typically found under a kitchen sink. The distiller may be mounted on suitable rollers in a roller housing to position the distiller unit at its desired location while allowing it to be moved forwardly out from under a sink, for access to the components for servicing and replacement, as described above.

Located beneath the support platform 652, is a foreshortened reservoir 654, which receives distilled water from the condenser 68 by way of filter 86, as previously described. A pump 92 delivers water from the reservoir, upon demand, to a sink faucet, refrigerator ice maker, or to other locations, under the control of the control circuit 112, described above. To permit periodic partial draining of the boiler 42, the boiler drain line 204, described with respect to FIG. 5, is connected through a valve 206 to a drain cup. This drain cup may be reached through a suitable access panel in the front or side of the distiller housing.

Air flow through the distiller housing is by way of a replaceable air inlet filter, which preferably is mounted in an opening in the front of the housing, and air vents at the top of the housing. The filter provides the dual purposes of protecting internal components from dust and of purifying the ambient room air.

Although the present invention has been described in terms of preferred embodiments, it will be apparent to those of skill in the art that numerous modifications and variations may be made without departing from the true spirit and scope thereof as set forth in the accompanying claims.

What is claimed is:

1. A method for reducing scaling in a distillation system comprising:
supplying fluid to the distillation system through an inlet fluid feed line;
preconditioning the fluid in said fluid feed line by passing the fluid through at least one filter in-line with said fluid feed line;
connecting an outlet of said fluid feed line to a double container boiler vessel having an outer container and an inner container and having a preheater region between said outer and inner containers, said outer container and said inner container being in fluid connection, and said outer container including a drain port;

supplying fluid from the fluid feed line to said boiler vessel to at least partially fill said preheater region and said inner container;

heating the fluid in said preheater region and said inner container so that a portion of the fluid in the preheater region and a portion of the fluid in the inner container each change phase to respective fluid vapors;

venting the fluid vapor in said preheater region through a plurality of vents in said outer container;

collecting the fluid vapor in said inner container; and transporting said inner container fluid vapor from inner container to a condenser.

2. The method for reducing scaling in a distillation system of claim 1, further comprising the step of draining said preheater region and said inner container periodically through said drain port.

3. The method for reducing scaling in a distillation system of claim 1, further including removably supporting said inner container in said outer container and closing the double boiler vessel.

4. The method for reducing scaling in a distillation system of claim 1, further including passing the fluid in said feed line through at least an in-line prefilter and a strainer.

5. The method of claim 1, further including:

locating a sensor housing having a sidewall and top and bottom adjacent said boiler vessel for detecting water levels in the vessel;

interconnecting the interior of the sensor housing with the interior of a distiller vessel below the water level to be detected; and locating a float switch assembly in said sensor housing to detect at least a lowest desired water level in the boiler vessel.

6. The method of claim 1, further including locating a plurality of vents around the upper periphery of said outer container for venting volatile organic compounds released by said water heated in said preheater region in order to prevent scaling within said boiler vessel.

* * * * *